US006999730B2

(12) United States Patent
Kojima et al.

(10) Patent No.: US 6,999,730 B2
(45) Date of Patent: Feb. 14, 2006

(54) LINE-OF-SIGHT RADIO COMMUNICATION TERMINAL, METHOD AND PROGRAM

(75) Inventors: Fumihide Kojima, Tokyo (JP); Hiroshi Harada, Tokyo (JP); Masayuki Fujise, Tokyo (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 356 days.

(21) Appl. No.: 10/415,260

(22) PCT Filed: Oct. 23, 2001

(86) PCT No.: PCT/JP01/09295

§ 371 (c)(1),
(2), (4) Date: Apr. 24, 2003

(87) PCT Pub. No.: WO02/35772

PCT Pub. Date: May 2, 2002

(65) Prior Publication Data

US 2004/0033784 A1    Feb. 19, 2004

(30) Foreign Application Priority Data

Oct. 24, 2000    (JP)    .............................. 2000-324310

(51) Int. Cl.
*H04B 1/44* (2006.01)
*H04B 1/38* (2006.01)
*H04M 1/00* (2006.01)
(52) U.S. Cl. .................. 455/73; 455/67.16; 455/553.1
(58) Field of Classification Search ............ 455/552.1, 455/67.16, 553.1, 73, 78
See application file for complete search history.

(56) References Cited

U.S. PATENT DOCUMENTS 6,622,011 B1 *    9/2003    Joeressen et al. ............. 455/88

(Continued)

FOREIGN PATENT DOCUMENTS

JP    06-037762    2/1994

(Continued)

OTHER PUBLICATIONS

F. Kojima et al., "An Autonomous Relay Access Scheme for Inter-Vehicle Communication Network, PIMRC 2000", The 11th IEEE International Symposium, Sep. 21, 2000, vol. 2, pp. 974-978.

(Continued)

*Primary Examiner*—Benny Quoc Tieu
(74) *Attorney, Agent, or Firm*—Mitchell P. Brook, Esq.; Luce, Forward, Hamilton & Scripps LLP

(57) ABSTRACT

A wireless communication terminal that ensures communication using a frequency band suitable for line-of-sight communication even if an obstruction is present in a wireless communication path or a status of a radio wave propagation path dynamically changes. An initial detecting section detects whether it is possible to communicate with another terminal of a master station mode. If communication is possible, a slave-mode setting section sets up a slave station mode, registers the other terminal in a master terminal storage section and transmits to the other terminal a communication indicating that a local terminal is subordinate to the master terminal. If communication is not possible, a master-mode setting section sets up a master station mode when a transmission is received indicating that the other terminal is subordinate to the local terminal. A slave terminal registration section registers the other terminal in a slave terminal storage section. A master station maintenance detection section checks regularly if communication with a slave station is possible. A slave station maintenance detection section checks regularly if communication with a master station is possible. If communication is not possible, an undetermined-mode setting section sets up an undetermined mode and a transmission section transmits a message that is received by a reception section.

45 Claims, 14 Drawing Sheets

U.S. PATENT DOCUMENTS 6,757,521 B1 * 6/2004 Ying .................. 455/67.11
6,757,523 B1 * 6/2004 Fry ...................... 455/78

FOREIGN PATENT DOCUMENTS

| JP | 07-288542 | 10/1995 |
|---|---|---|
| JP | 2000-013376 | 1/2000 |
| JP | 2000-082990 | 3/2000 |
| JP | 2000-092076 | 3/2000 |
| JP | 2000-151608 | 5/2000 |
| JP | 2000-269985 | 9/2000 |
| JP | 2000-278280 | 10/2000 |

OTHER PUBLICATIONS

Katsuhiro Yamanaka, et al., "A Portable Wireless Terminal and a Method to Collect ID for Ubiquitous Store System", Joho Short Gakkai Kenkyu Houkoku, vol. 99, No. 50, May 28, 1999, pp. 57-62.

* cited by examiner

FIG.6
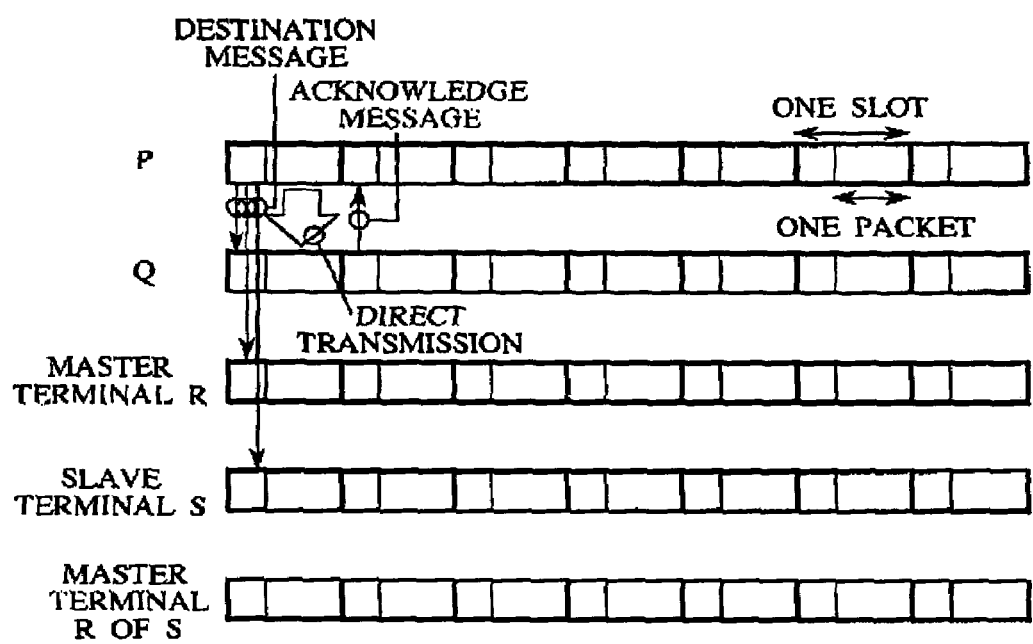
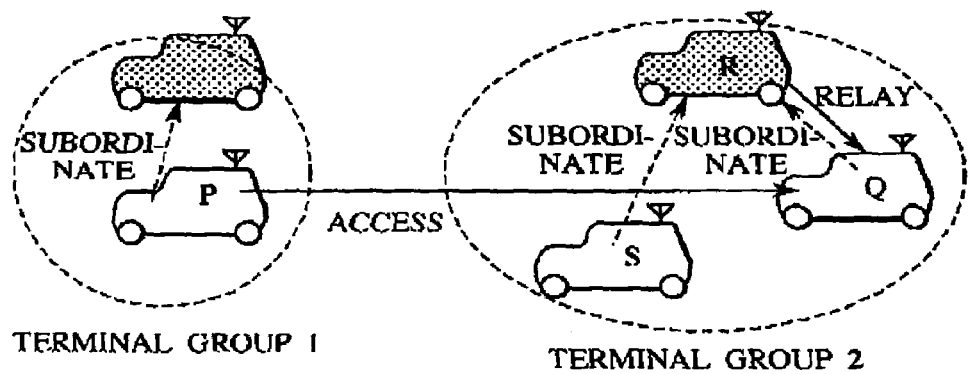
TERMINAL GROUP 1    TERMINAL GROUP 2

FIG.7
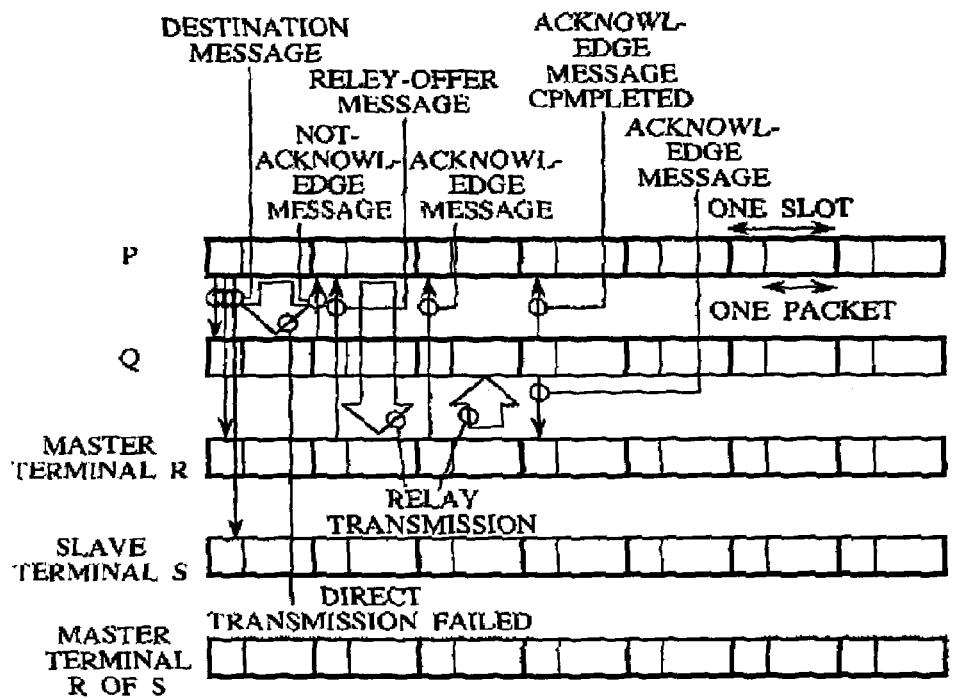
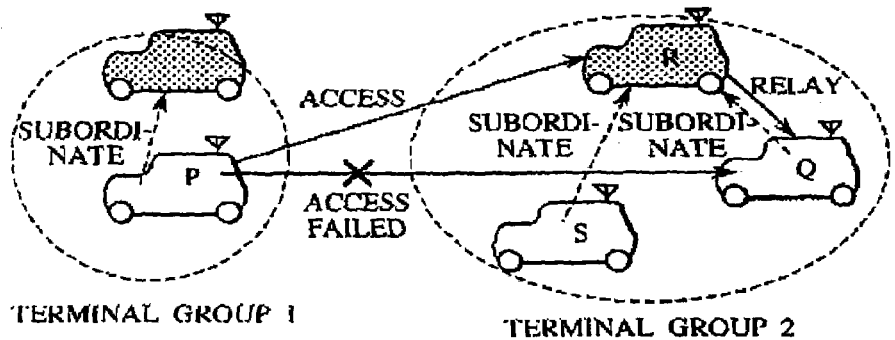

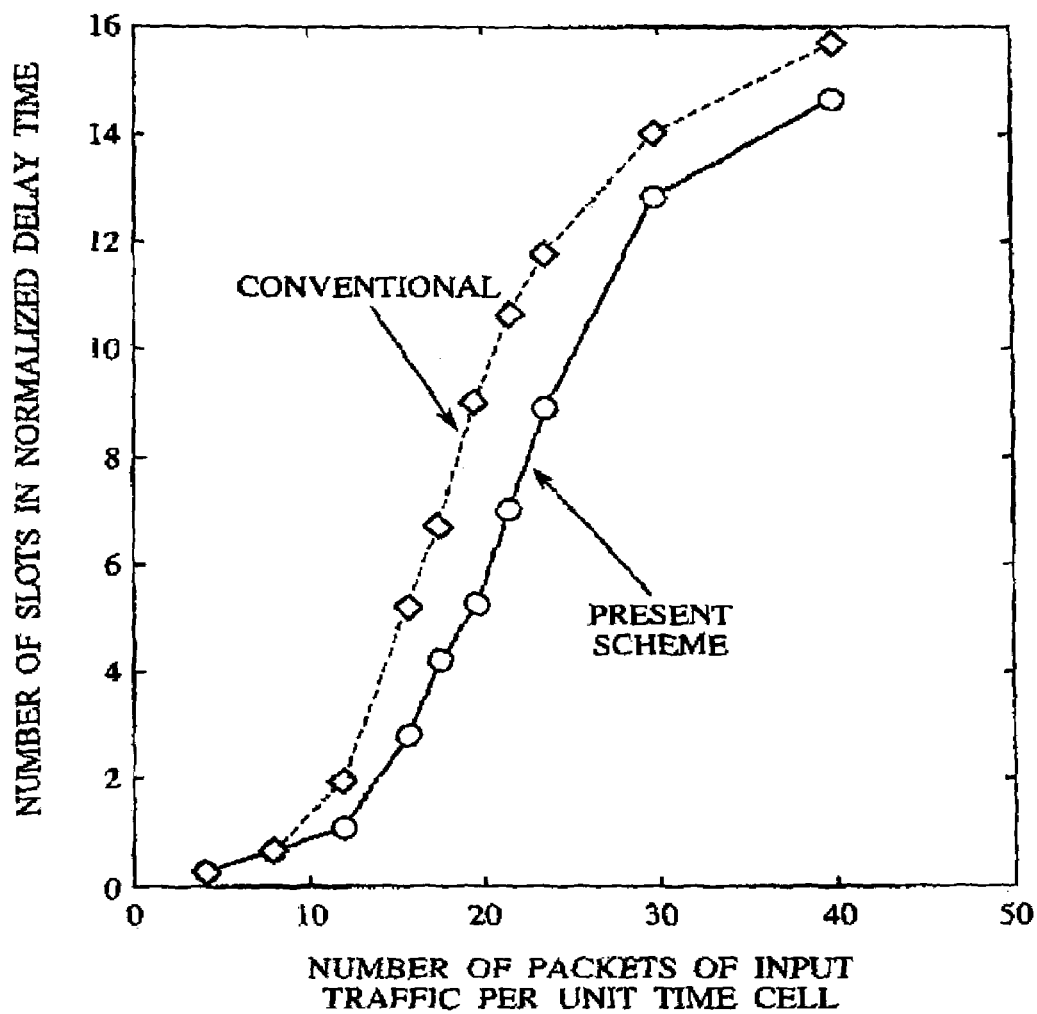

LINE-OF-SIGHT RADIO COMMUNICATION TERMINAL, METHOD AND PROGRAM

TECHNICAL FIELD

The present invention relates to a wireless communication terminal, a wireless communication method and an information recording medium.

Particularly, the invention relates to a wireless communication terminal and a wireless communication method which are suitable to be able to ensure communication by carrying out relay even in wireless communication using a frequency band suitable for line-of-sight communication even if an obstruction is present in the path of wireless communication and even if the status of the radio wave propagation path dynamically changes, and a computer readable information recording medium in which a program for achieving them is recorded.

BACKGROUND ART

Mobile wireless communication systems, such as an analog portable telephone, PDC (Personal Digital Cellular) and PHS (Personal Handyphone System), which execute mobile communications outdoors using a microwave frequency band and quasi-microwave frequency band are becoming popular. Wireless communication systems, such as cordless telephones, which use a milliwave frequency band have been proposed and their studies and developments are underway.

In wireless communication between mobile units and between a stationary unit and a mobile unit using the milliwave frequency band, the microwave frequency band or the quasi-microwave frequency band, e.g., the 2 GHz band, in particular, the status of the propagation path between two often significantly changes as the position of a mobile unit dynamically varies.

In communication in such a frequency band, however, if a communication party is hid behind an obstruction, attenuation by the obstruction occurs. Even in case where the distance between two becomes longer, the distance-originated attenuation is likely to occur. Such attenuation is prominent particularly in the frequency band that is suited for line-of-sight (Line of Sight; LoS) communication.

Therefore, there occurred a problem such that such attenuation would deteriorate the transfer quality and communication itself would become impossible.

The invention has been made to overcome the above-described problem and aims at providing a wireless communication terminal and a wireless communication method which are suitable to be able to ensure communication by carrying out relay even in wireless communication using a frequency band suitable for line-of-sight communication even if an obstruction is present in the path of wirel ss communication and even if the status of the radio wave propagation path dynamically changes, and a computer readable information recording medium in which a program for achieving them is recorded.

DISCLOSURE OF INVENTION

To achieve the object, according to the principle of the invention, the following subject matters will be disclosed.

A wireless communication terminal according to the first aspect of the invention operates in operation modes including an undetermined mode, a master station mode and a slave station mode and is constructed to have an initial detecting section, a slave-mode setting section, a master-mode setting section, a slave terminal registration section, a master station maintenance detection section, a slave station maintenance detection section, an undetermined-mode setting section, a transmission section and a reception section.

Here, in case where an operation mode is set to the undetermined mode, the initial detecting section detects if communication with another wireless communication terminal that operates in the master station mode is possible.

In case where it is detected by the initial detecting section that communication with another wireless communication terminal which operates in the master station mode is possible, the slave-mode setting section sets the operation mode to the slave station mode, registers the another wireless communication terminal as a master terminal and transmits subordination information to the effect that the local is subordinate to the master terminal.

Further, the master-mode setting section sets the operation mode to the master station mode in case where it is detected by the initial detecting section that communication with the another wireless communication terminal which operates in the master station mode is not possible.

And, the slave terminal registration section registers the another wireless communication terminal as a slave terminal in case where the operation mode is set to the master station mode and subordination information to the effect that the another wireless communication terminal which operates in the master station mode is subordinate to the local is received.

In the meantime, the master station maintenance detection section detects if communication with the another wireless communication terminal registered as the slave terminal is possible when the operation mode is set to the master station mode.

Further, the slave station maintenance detection section detects if communication with the another wireless communication terminal registered as the master terminal is possible when the operation mode is set to the slave station mode.

And, the undetermined-mode setting section sets the operation mode to the undetermined mode in case where it is detected by the master station maintenance detection section that communication with the another wireless communication terminal registered as the slave terminal is not possible, or in case where it is detected by the slave station maintenance detection section that communication with the another wireless communication terminal registered as the master terminal is not possible or in case where the operation mode is set to the master station mode and no wireless communication terminal is registered as the slave terminal.

In the meantime, the transmission section transmits a message to another wireless communication terminal.

And, the reception section receives a message from another wireless communication terminal.

The wireless communication terminal of the invention can be constructed in such a way that the master station maintenance detection section does not perform detection until a time over which the operation mode has maintained the master station mode exceeds a predetermined time after it is detected by the master station maintenance detection section that communication with another wireless communication terminal registered as a slave terminal is possible.

The wireless communication terminal of the invention can be constructed in such a way that the slave station maintenance detection section does not perform detection until a time over which the operation mode has maintained the master station mode exceeds a predetermined time after it is detected by the slave station maintenance detection section that communication with another wireless communication terminal registered as a master terminal is possible.

The wireless communication terminal of the invention (hereinafter called "sender terminal") can be constructed as follows in case where data information is transferred from the sender terminal to another wireless communication terminal (hereinafter called "destination terminal").

That is, the transmission section transmits a destination message designating the destination terminal and a data information message designating the data information.

And, in case where an acknowledge message to the effect that the reception section has received the data information from the destination terminal could not be received and a relay-offer message to the effect transmission to the destination terminal will be relayed has been received from a wireless communication terminal other than the destination terminal (hereinafter called "relay terminal"), the transmission section transmits the data information message designating the data information and addressed to the destination terminal to the relay terminal.

The wireless communication terminal of the invention (hereinafter called "destination terminal") can be constructed as follows.

That is, in case where the reception section has received from another wireless communication terminal (hereinafter called "sender terminal") a destination message designating the destination terminal and a data information message designating data information addressed to the destination terminal, the transmission section transmits an acknowledge message to the effect that the data information has been received to the sender terminal.

The wireless communication terminal of the invention (hereinafter called "destination terminal") can be constructed as follows.

That is, in case where the reception section has received from another wireless communication terminal (hereinafter called "sender terminal") a destination message designating the destination terminal and has not received a data information message designating data information addressed to the destination terminal from the sender terminal, the transmission section transmits a not-acknowledge message to the effect that the data information has not been received to the sender terminal.

The wireless communication terminal of the invention (hereinafter called "relay terminal") can be constructed as follows.

That is, in case where the reception section has received from another wireless communication terminal (hereinafter called "destination terminal") a destination message designating a wireless communication terminal registered as a slave terminal (hereinafter called "destination terminal"), the transmission section transmits to the sender terminal a relay-offer message to the effect that transmission to the destination terminal will be relayed.

Further, in case where the reception section has received a data information message designating data information addressed to the destination terminal from the sender terminal, the transmission section transmits a destination message designating the destination terminal and a data information message designating the data information to the destination terminal.

The wireless communication terminal of the invention (hereinafter called "relay terminal") can be constructed as follows when the operation mode is set to the master station mode.

That is, in case where the reception section has received from another wireless communication terminal registered as a slave terminal (hereinafter called "sub relay terminal") an inquiry message designating another wireless communication terminal registered (hereinafter called "destination terminal"), the transmission section transmits a relay-approval message to the sub relay terminal if the destination terminal is also registered as a slave terminal.

Further, in case where the reception section has received a data information message designating data information addressed to the destination terminal from the sub relay terminal, the transmission section transmits a destination message designating the destination terminal and a data information message designating the data information to the destination terminal.

The wireless communication terminal of the invention (hereinafter called "sub relay terminal") can be constructed as follows when the operation mode is set to the slave station mode.

That is, in case where the reception section has received from another wireless communication terminal (hereinafter called "sender terminal") a destination message designating another wireless communication terminal (hereinafter called "destination terminal"), the transmission section transmits an inquiry message designating the destination terminal to a wireless communication terminal registered as a master terminal (hereinafter called "relay terminal").

Further, in case where the reception section has received a relay-approval message from the relay terminal, the transmission section transmits to the sender terminal a relay-offer message to the effect that transmission to the destination terminal will be relayed.

Further, in case where the reception section has received a data information message designating data information addressed to the destination terminal from the sender terminal, the transmission section transmits a data information message designating the data information to the destination terminal to the relay terminal.

The wireless communication terminal of the invention can be constructed in such a way that the data information message and other messages are transmitted in time divisional manner in transmission by the transmission section and the reception section.

The wireless communication terminal of the invention can be constructed in such a way that the relay-offer message designates a reception status parameter (including a parameter of reception power, a parameter of a use status of a frequency channel or a parameter of a distance and direction to the sender terminal) at a time the destination message has been received by the reception section.

The wireless communication terminal of the invention can be constructed in such a way that the transmission section transmits the data information message designating the data information addressed to the destination terminal to the relay terminal using a transmission parameter (including a parameter of transmission power, a parameter of a frequency channel to be used in transmission, a parameter of a modulation system, a parameter of a beam shape) corresponding to a reception status parameter (including a parameter of reception power, a parameter of a use status of a frequency channel or a parameter of a distance and direction to the sender terminal) designated in the relay-offer message.

A wireless communication terminal according to another aspect of the invention (hereinafter called "local") is a wireless communication terminal which is capable of relaying communication to another wireless communication terminal, has an input section, a transmission section, a reception section and an output section, and is constructed as follows.

(a) The input section accepts inputting of a destination terminal and data information addressed to the destination terminal.

(b) The transmission section transmits a destination data information message designating the destination terminal inputting of whose has been accepted and the data information addressed it as a destination terminal using a predetermined transmission parameter (including a parameter of transmission power, a parameter of a frequency channel to be used in transmission, a parameter of a modulation system, a parameter of a beam shape).

(c) The output section outputs the data information when the reception section has received a 'destination data information message addressing the local'.

(d) When the reception section has received a 'destination data information message addressing, as a destination terminal, another wireless communication terminal (hereinafter called "relayable terminal") to which the local can relay communication', a 'relay-offer message designating a reception status parameter (including a parameter of reception power, a parameter of a use status of a frequency channel or a parameter of a distance and direction to the sender terminal) at a time the destination data information message has been received' is transmitted.

(e) When the reception section has received the relay-offer message, the transmission section transmits the destination data information message to that terminal which has sent the relay-offer message, by using a transmission parameter associated with the reception status parameter designated in the relay-offer message.

(f) When the reception section has received a 'destination data information message designating data information addressing, as a destination terminal, "a relayable terminal targeted for the relay-offer message transmitted earlier by the transmission section", the transmission section transmits the destination data information message to the relayable terminal.

The wireless communication terminal of the invention can be constructed in such a way that in case where the transmission section transmits the destination data information message using the predetermined transmission parameter, transmission power for transmitting that portion in the destination data information message which designates the data information is lower than transmission power for transmitting that portion which designates the destination terminal.

A wireless communication method according to a further aspect of the invention uses operation modes including an undetermined mode, a master station mode and a slave station mode and can be constructed so as to have an initial detecting step, a slave-mode setting step, a master-mode setting step, a slave terminal registration step, a master station maintenance detection step, a slave station maintenance detection step, an undetermined-mode setting step, a transmission step and a reception step.

Here, in case where an operation mode is set to the undetermined mode, in the initial detecting step, it is detected if communication with another wireless communication terminal that operates in the master station mode is possible.

In case where it is detected in the initial detecting step that communication with another wireless communication terminal which operates in the master station mode is possible, in the slave-mode setting step, the operation mode is set to the slave station mode, the another wireless communication terminal is registered as a master terminal and subordination information to the effect that the local is subordinate to the master terminal is transmitted.

Further, in the master-mode setting step, the operation mode is set to the master station mode in case where it is detected in the initial detecting step that communication with the another wireless communication terminal which operates in the master station mode is not possible.

And, in the slave terminal registration step, the another wireless communication terminal is registered as a slave terminal in case where the operation mode is set to the master station mode and subordination information to the effect that the another wireless communication terminal which operates in the master station mode is subordinate to the local is received.

In the meantime, in the master station maintenance detection step, it is detected if communication with the another wireless communication terminal registered as the slave terminal is possible when the operation mode is set to the master station mode.

Further, in the slave station maintenance detection step, it is detected if communication with the another wireless communication terminal registered as the master terminal is possible when the operation mode is set to the slave station mode.

And, in the undetermined-mode setting step, the operation mode is set to the undetermined mode in case where it is detected in the master station maintenance detection step that communication with the another wireless communication terminal registered as the slave terminal is not possible, or in case where it is detected in the slave station maintenance detection step that communication with the another wireless communication terminal registered as the master terminal is not possible or in case where the operation mode is set to the master station mode and no wireless communication terminal is registered as the slave terminal.

The wireless communication method of the invention can be designed in such a way that detection by the master station maintenance detection step is executed again in case where a time over which the operation mode has maintained the master station mode has exceeded a predetermined time since it was detected in the master station maintenance detection step that communication with another wireless communication terminal registered as a slave terminal would be possible.

The wireless communication method of the invention can be designed in such a way that detection by the slave station maintenance detection step is executed again in case where a time over which the operation mode has maintained the master station mode has exceeded a predetermined time since it was detected by the slave station maintenance detection step that communication with another wireless communication terminal registered as a master terminal would be possible.

The wireless communication method of the invention can be designed so as to further comprise the following steps in case where data information is transferred from a wireless communication terminal (hereinafter called "sender terminal") which performs the method to another wireless communication terminal (hereinafter called "destination terminal").

(1) A step of transmitting a destination message designating the destination terminal and a data information message designating the data information.

(2) A step of, in case where an acknowledge message to the effect that the data information has been received from the destination terminal could not be received and a relay-offer message to the effect transmission to the destination terminal will be relayed has been received from a wireless communication terminal other than the destination terminal (hereinafter called "relay terminal") transmitting the data information message designating the data information and addressed to the destination terminal to the relay terminal.

In a wireless communication terminal (hereinafter called "destination terminal") which performs the method, in case where a destination message designating the destination terminal and a data information message designating data information addressed to the destination terminal has been received from another wireless communication terminal (hereinafter called "sender terminal"), the wireless communication method of the invention can be designed so as to further comprise a step of transmitting an acknowledge message to the effect that the data information has been received to the sender terminal.

In a wireless communication terminal (hereinafter called "destination terminal") which performs the method, in case where a destination message designating the destination terminal has been received from another wireless communication terminal (hereinafter called "sender terminal") and a data information message designating data information addressed to the destination terminal has not been received from the sender terminal, the wireless communication method of the invention can be designed so as to further comprise a step of transmitting a not-acknowledge message to the effect that the data information has not been received to the sender terminal.

When the operation mode is set to the master station mode in a wireless communication terminal (hereinafter called "relay terminal") which performs the method, the wireless communication method of the invention can be designed so as to further comprise the following steps.

(1) A step of, in case where a destination message designating a wireless communication terminal registered as a slave terminal (hereinafter called "destination terminal") has been received from another wireless communication terminal (hereinafter called "destination terminal"), transmitting to the sender terminal a relay-offer message to the effect that transmission to the destination terminal will be relayed.

(2) Further, a step of, in case where a data information message designating data information addressed to the destination terminal has been received from the sender terminal, transmitting a destination message designating the destination terminal and a data information message designating the data information to the destination terminal.

When the operation mode is set to the master station mode in a wireless communication terminal (hereinafter called "relay terminal") which performs the method, the wireless communication method of the invention can be designed so as to further comprise the following steps.

(1) A step of, in case where an inquiry message designating another wireless communication terminal registered (hereinafter called "destination terminal") has been received from another wireless communication terminal registered as a slave terminal (hereinafter called "sub relay terminal"), transmitting a relay-approval message to the sub relay terminal if the destination terminal is also registered as a slave terminal.

(2) Further, a step of, in case where a data information message designating data information addressed to the destination terminal has been received from the sub relay terminal, transmitting a destination message designating the destination terminal and a data information message designating the data information to the destination terminal.

When the operation mode is set to the slave station mode in a wireless communication terminal (hereinafter called "sub relay terminal") which performs the method, the wireless communication method of the invention can be designed so as to further comprise the following steps.

(1) A step of, in case where a destination message designating another wireless communication terminal (hereinafter called "destination terminal") has been received from another wireless communication terminal (hereinafter called "sender terminal"), transmitting an inquiry message designating the destination terminal to a wireless communication terminal registered as a master terminal (hereinafter called "relay terminal").

(2) Further, a step of, in case where a relay-approval message has been received from the relay terminal, transmitting to the sender terminal a relay-offer message to the effect that transmission to the destination terminal will be relayed.

(3) Further, a step off, in case where a data information message designating data information addressed to the destination terminal has been received from the sender terminal, transmitting a data information message designating the data information to the destination terminal to the relay terminal.

The wireless communication method of the invention can be designed in such a way that the data information message and other messages are transmitted in time divisional manner.

The wireless communication method of the invention can be designed in such a way that the relay-offer message designates a reception status parameter (including a parameter of reception power, a parameter of a use status of a frequency channel or a parameter of a distance and direction to the sender terminal) at a time the destination message has been received.

The wireless communication method of the invention can be designed in such a way that in case of transmitting a data information message designating the data information addressed to the destination terminal to the relay terminal, the message is transmitted using a transmission parameter (including a parameter of transmission power, a parameter of a frequency channel to be used in transmission, a parameter of a modulation system, a parameter of a beam shape) corresponding to a reception status parameter (including a parameter of reception power, a parameter of a use status of a frequency channel or a parameter of a distance and direction to the sender terminal) designated in the relay-offer message.

A wireless communication method according to a further aspect of the invention in which a predetermined wireless communication terminal (hereinafter called "local") is set beforehand and which can relay communication to another wireless communication terminal other than that terminal can be constructed so as to comprise the following steps.

(a) A step of accepting inputting of a destination terminal and data information addressed to the destination terminal.

(b) A step of transmitting a destination data information message designating the destination terminal inputting of whose has been accepted and the data information addressed it as a destination terminal using a predetermined transmission parameter (including a parameter of transmission power, a parameter of a frequency channel to be used in transmission, a parameter of a modulation system, a parameter of a beam shape).

(c) A step of outputting the data information when a 'destination data information message addressing the local' has been received.

(d) A step of, when a 'destination data information message addressing, as a destination terminal, another wireless communication terminal (hereinafter called "relayable terminal") to which the local can relay communication' has been received, transmitting a 'relay-offer message designating a reception status parameter (including a parameter of reception power, a parameter of a use status of a frequency channel or a parameter of a distance and direction to the sender terminal) at a time the destination data information message has been received' is transmitted.

(e) A step of, when the relay-offer message has been received, transmitting the destination data information message to that terminal which has sent the relay-offer message, by using a transmission parameter associated with the reception status parameter designated in the relay-offer message.

(f) A step of, when a 'destination data information message designating data information addressing, as a destination terminal has been received, "a relayable terminal targeted for the relay-offer message transmitted earlier by the transmission section", transmitting the destination data information message to the relayable terminal.

The wireless communication method of the invention can be designed in such a way that in case of transmitting the destination data information message using the predetermined transmission parameter, transmission power for transmitting that portion in the destination data information message which designates the data information is lower than transmission power for transmitting that portion which designates the destination terminal.

A program according to a further aspect of the invention is so designed as to allow a computer to function as the above-described wireless communication terminals.

As the program of the invention is executed by a computer which can communicate with another wireless communication terminal, the wireless communication terminal and wireless communication method of the invention can be realized.

An information recording medium in which the program of the invention is recorded can be distributed and sold independently of the computer. The program of the invention can be transferred, distributed and sold via a computer communication network, such as the Internet.

In case where the computer has a programmable electronic circuit, such as a DSP (Digital Signal Processor) or FPGA (Field Programmable Gate Array), particularly, it is possible to use a software radio type scheme in which the wireless communication terminal of the invention is provided by transferring the program that is recorded on the information recording medium of the invention to the computer wirelessly and allowing a DSP or FPGA in the computer to execute it.

BRIEF DESCRIPTION OF DRAWINGS

FIG. 6 is an explanatory diagram showing how transmission from a sender terminal to a destination terminal which belongs to a different terminal group is carried out.

FIG. 7 is an explanatory diagram showing how transmission from a sender terminal to a destination terminal which belongs to a different terminal group is carried out via a relay terminal which is a master terminal of the destination terminal.

FIG. 10 is a graph showing the results of an experiment on the relationship between the input traffic and communication delay.

BEST MODE FOR CARRYING OUT THE INVENTION

Embodiments of the invention will be described below. The embodiments to be discussed below are to be considered as illustrative and no restrictive and the scope of the invention is not to be limited. Therefore, it would be possible for those skilled in the art to use those individual elements or embodiments in which all the elements are replaced with equivalent ones, but those embodiments should also be included in the scope of the invention.

(First Embodiment)

Figure 1:
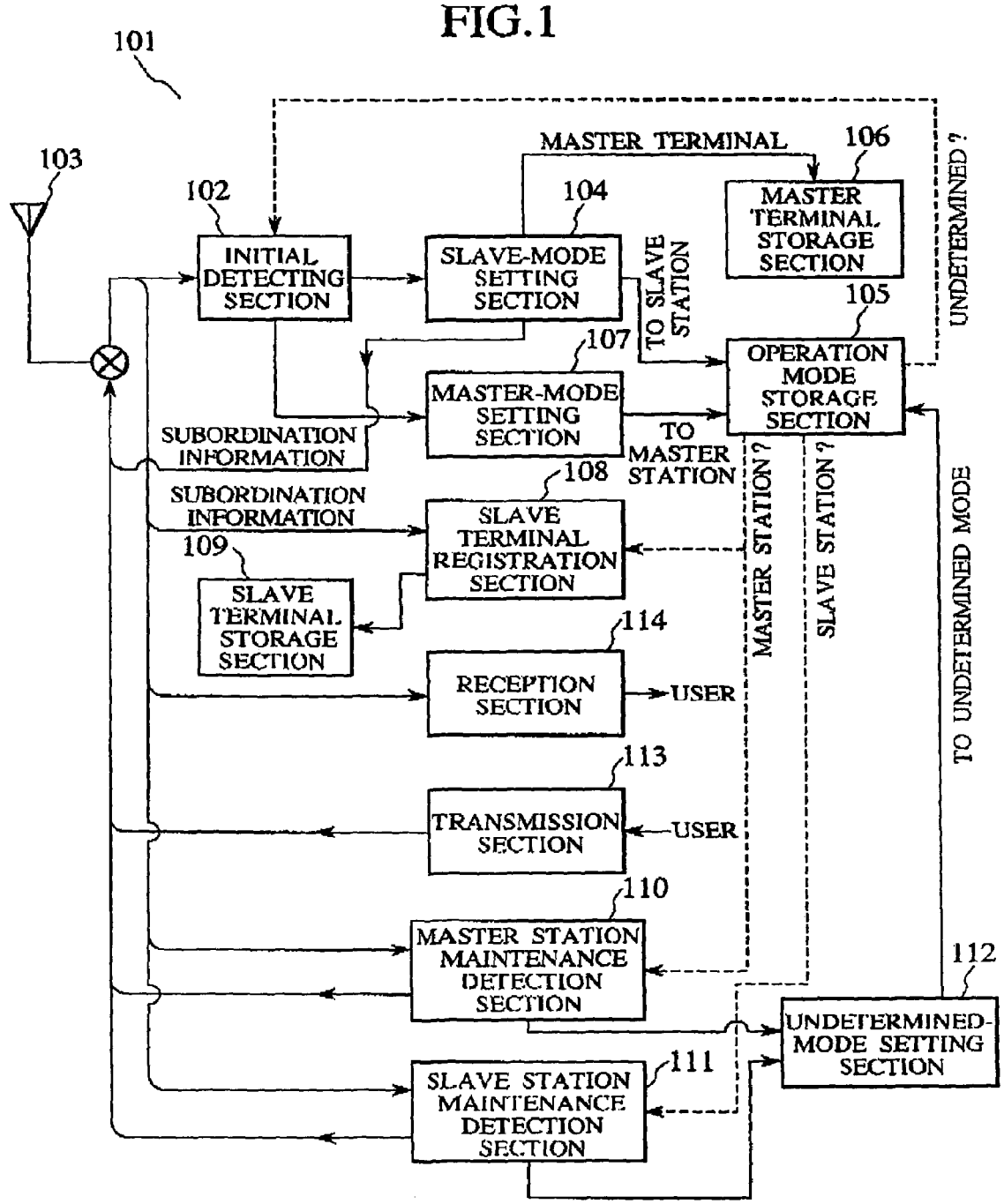
FIG. 1 is an exemplary diagram illustrating the schematic structure of an embodiment of a wireless communication terminal according to the invention.

FIG. 1 is an exemplary diagram illustrating the schematic structure of an embodiment of a wireless communication terminal according to the invention. A description will be given below by referring to this diagram.

A wireless communication terminal 101 operates in one of operation modes, an undetermined mode, a master station mode or a slave station mode.

In case where the wireless communication terminal 101 is operating in the undetermined mode, an initial detecting section 102 of the wireless communication terminal 101 detects if communication with another wireless communication terminal that operates in the master station mode via an antenna 103 is possible.

Further, in case where there are plural communicatable wireless communication terminals that operate as a master station, the initial detecting section best propagation path as a master station.

In case where it is detected by the initial detecting section 102 that communication with another wireless communication terminal which operates in the master station mode is possible, a slave-mode setting section 104 sets the operation mode to the slave station mode, registers the another wireless communication terminal as a master terminal and transmits subordination information to the effect that the local is subordinate to the master terminal.

The setting of the operation mode is stored in an operation mode storage section 105 and the information on the master terminal is stored in a master terminal storage section 106.

Meanwhile, in case where it is detected by the initial detecting section 102 that communication with the another wireless communication terminal which operates in the master station mode is not possible, a master-mode setting section 107 sets the operation mode to the master station mode.

And, in case where the operation mode is set to the master station mode and subordination information to the effect that the another wireless communication terminal which operates in the master station mode is subordinate to the local is received via the antenna 103, a slave terminal registration section 108 registers the another wireless communication terminal as a slave terminal.

The information on the slave terminal is stored in a slave terminal storage section 109.

In the meantime, when the operation mode is set to the master station mode, while the operation mode is the master station, a master station maintenance detection section 110 regularly detects at every predetermined time period if communication with the slave terminal stored in the slave terminal storage section 109 is possible.

Further, when the operation mode is set to the slave station mode, while the operation mode is the slave station, a slave station maintenance detection section 111 regularly detects at every predetermined time period if communication with the master terminal stored in the master terminal storage section 106 is possible.

And, an undetermined-mode setting section 112 sets the operation mode to the undetermined mode in any of the following cases.

(a) A case where it is detected by the master station maintenance detection section 110 that communication with the slave terminal is not possible.

(b) A case where it is detected by the slave station maintenance detection section 111 that communication with the master terminal is not possible.

(c) A case where the operation mode is set to the master station mode and a predetermined time has elapsed with no wireless communication terminal registered as a slave terminal.

In the meantime, a transmission section 113 transmits a message to another wireless communication terminal.

Further, a reception section 114 receives a message from another wireless communication terminal.

Although the illustration of a bandpass filter, a modulator/demodulator and the like which are used in an ordinary wireless communication terminal is omitted in this diagram, the wireless communication terminal 101 can be realized by using ordinary well-known techniques.

The operation mode storage section 105, the master terminal storage section 10 and the slave terminal storage section 109 can be realized by a RAM (Random Access Memory) or the like.

The slave-mode setting section 104, the master-mode setting section 107 and the undetermined-mode setting section 112 can be realized by a CPU (Central Processing Unit; central processing unit) which controls the wireless communication terminal 101.

The initial detecting section 102, the slave terminal registration section 108, the master station maintenance detection section 110, the slave station maintenance detection section 111, the transmission section 113 and the reception section 114 can be realized by the cooperation of the CPU and an ordinary mobile communication unit.

In the embodiment, stable communication can be ensured by using, as the condition for "communicatable" with another terminal, the condition such that not only communication is possible but also the carrier power v.s. noise power ratio (hereinafter called "CN ratio") exceeds a predetermined threshold value. For the sake of easier understanding, that communication is possible and the CN ratio is greater than a predetermined threshold value is simply said to be "communication is possible" in the following description.

(Operation Mode Changing Process)

Figure 2:
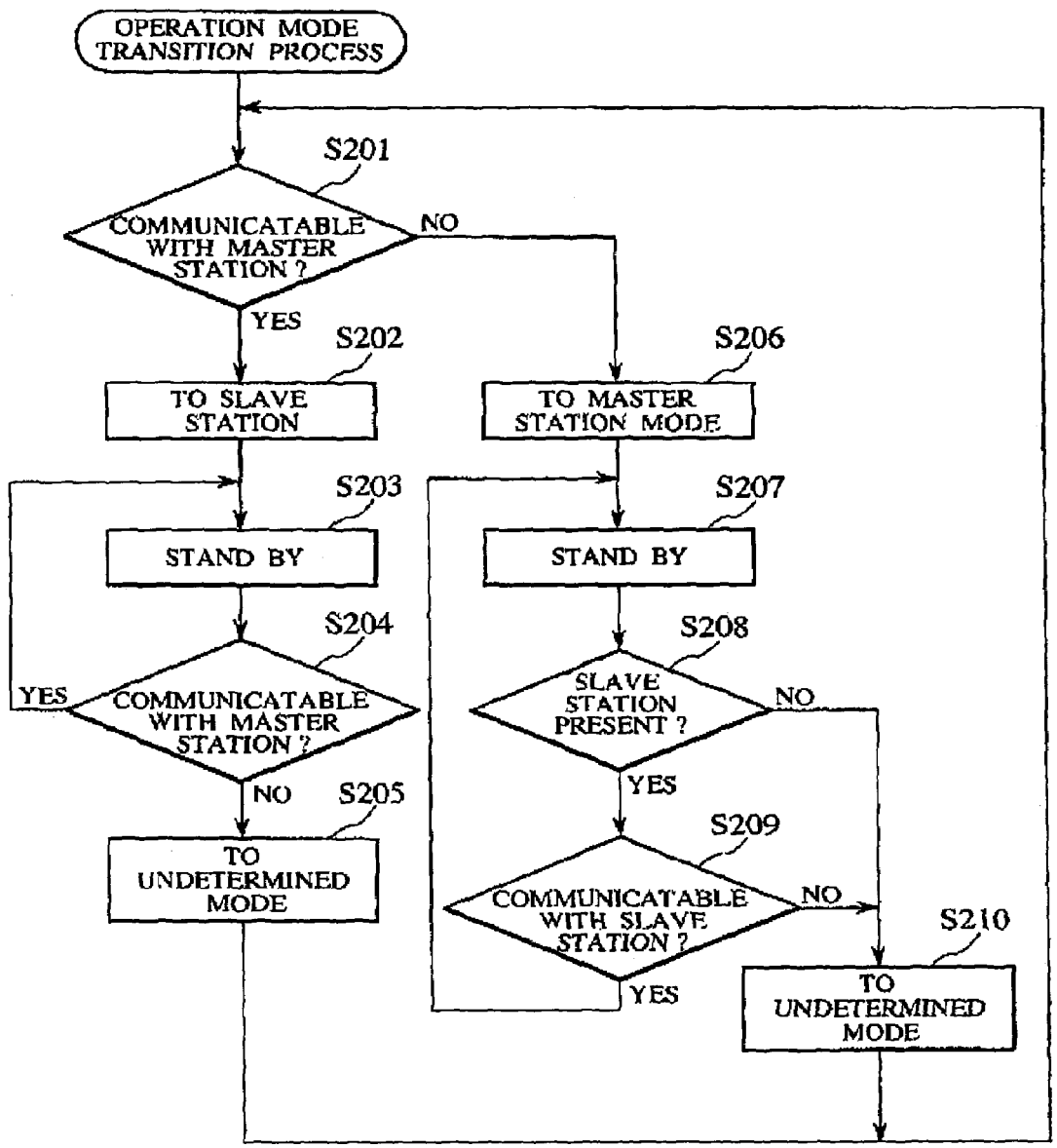
FIG. 2 is a flowchart illustrating the flow of control of an operation mode transition process which changes the operation mode of a wireless communication terminal.

FIG. 2 is a flowchart illustrating the flow of control of an operation mode transition process which changes the operation mode of the wireless communication terminal 101. A description will be given below by referring to this diagram.

The wireless communication terminal 101 is set to the undetermined mode immediately after power is given. First, it is checked if communication with another terminal which operates in the master station mode is possible (step S201).

In case where communication with another terminal which operates in the master station mode is possible (step S201; Yes), the operation mode is set to the slave station mode (step S202). At this time, the master terminal is registered and subordination information is sent to the master terminal. Then, after standing by for a predetermined time (step S203), it is checked if communication with the master terminal is possible (step S204), and, if possible (step S204; Yes), the process returns to step S203. If it is not possible (step S204; No), the operation mode is set to the undetermined mode (step S205). This allows the process to return to step S201.

In case where communication with another terminal which operates in the master station mode is not possible (step S201; No), the operation mode is set to the master station mode (step S206). While the operation mode is the master station mode, when subordination information is received from another terminal, that terminal is registered as a slave terminal.

Then, after standing by for a predetermined time (step S207), it is checked if there is a terminal registered as a slave terminal (step S208), and, if not possible (step S208; No), the operation mode is set to the undetermined mode (step S210) and the process returns to step S201.

If there are terminals registered as a slave terminal (step S208; Yes), it is checked if communication with them is possible (step S209), and, if communication is possible (step S209; Yes), the process returns to step S207 whereas if it is not (step S209; No), the operation mode is set to the undetermined mode (step S210) and the process returns to step S201.

The standby time in step S203 and step S207 may be 0. Further, the detection of the communicatable/non-communicatable status and the moment of the status change may be processed by interruption.

(How Operation Made is Determined)

Figure 3:
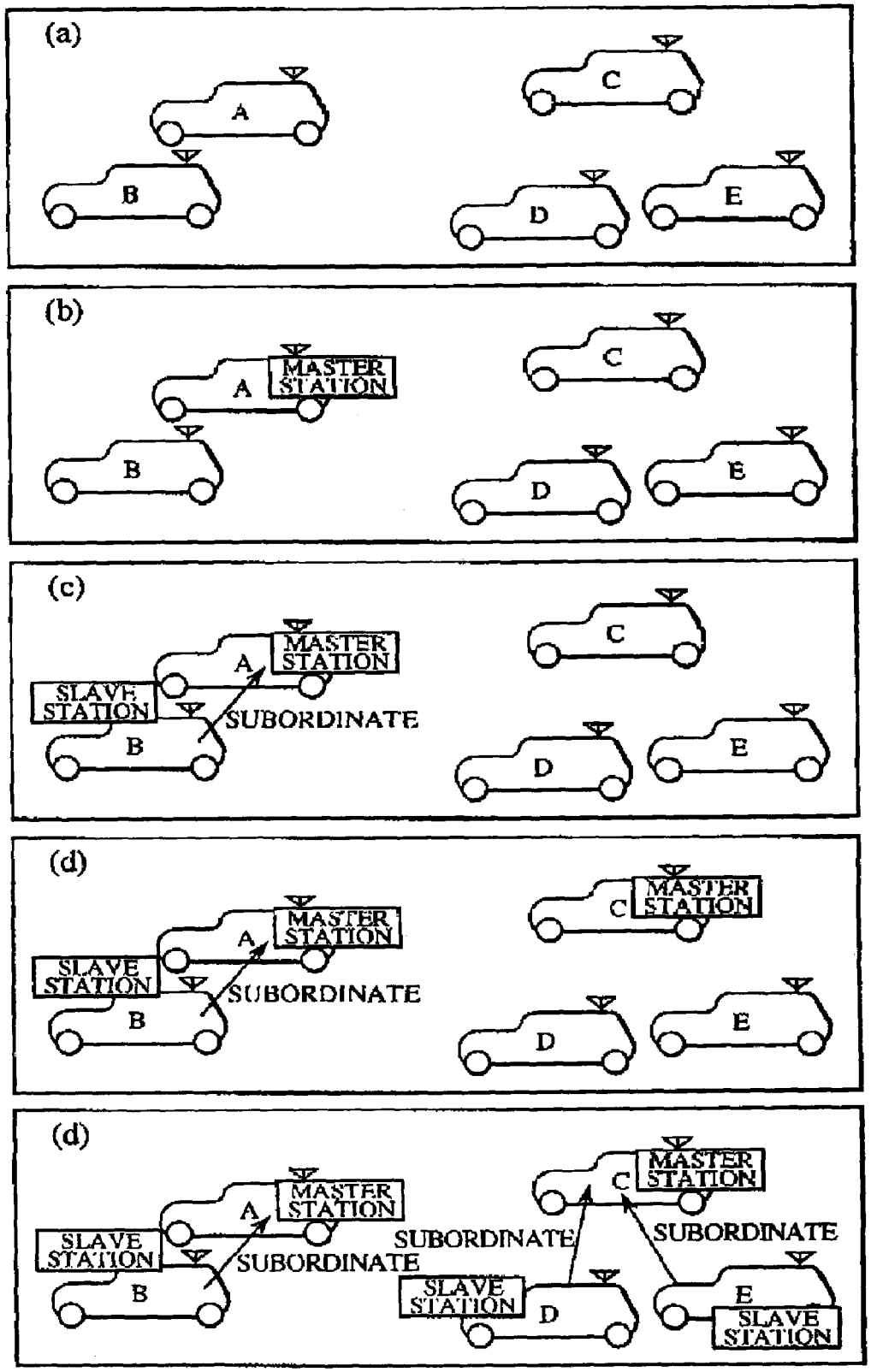
FIG. 3 is an explanatory diagram showing how wireless communication terminals, installed on vehicles, detect one another and determine the operation mode.

FIG. 3 is an explanatory diagram showing how wireless communication terminals of this embodiment are installed on vehicles, detect one another and determine the operation mode. A description will be given below by referring to this diagram.

FIG. 3(a) shows five wireless communication terminals, A, B, C, D and E, in the order of detection. It is assumed that any of A, B, C, D and E is in the initial state and their operation modes are not set (or are set to the slave station mode). A and B can communicate with each other, and C, D and E can communicate with one another.

Here, as A performs detection, it can communicate with B and can see that B is not a master station. So, the operation mode of A is set to the master station. FIG. 3(b) shows the situation.

Then, as B performs detection, it can see that it can communicate with A or master station. So, the operation mode of B becomes the slave station and B gives a notification to that effect to A. A registers B as a slave terminal and B registers A as a master terminal. FIG. 3(c) shows that situation.

Further, as C performs detection, it can see that communication with both D and E is possible but neither is a master terminal, So, the operation mode of C is set to the master station. FIG. 3(d) shows the situation.

Then, as D performs detection, it can see that it can communicate with C or a master station. So, the operation mode of D becomes the slave station and D gives a notification to that effect to C. C registers D as a slave terminal and D registers C as a master terminal. It is to be noted that while D is also communicatable with E, it does not select E because E is not a master terminal.

Further, as E performs detection, it can see that it can communicate with C or a master station. So, the operation mode of E becomes the slave station and E gives a notification to that effect to C. C registers E as a slave terminal and E registers C as a master terminal. It Is to be noted that while E is also communicatable with D, it does not select D because D is not a master terminal. FIG. 3(e) shows that situation.

As a result, A registers B as a slave terminal and C registers C D a slave terminal.

Apparently, more than zero slave stations are subordinate to a single master station. Therefore, group separation is carried out master station by master station.

In this manner, the relationship between a master station and a slave station is set autonomously. Update of them can be executed by each wireless communication terminal 101 at an independent timing.

The autonomous group separation in the embodiment guarantees that a master station and a slave station subordinate to it have a good communication therebetween.

Further, communication between a master station and another master station is not good in most cases. This is because that if it is good, one should become a slave station to the other one.

Communication between slave stations belonging to different groups may or may not be good. This differs depending on the situation.

Figure 4:
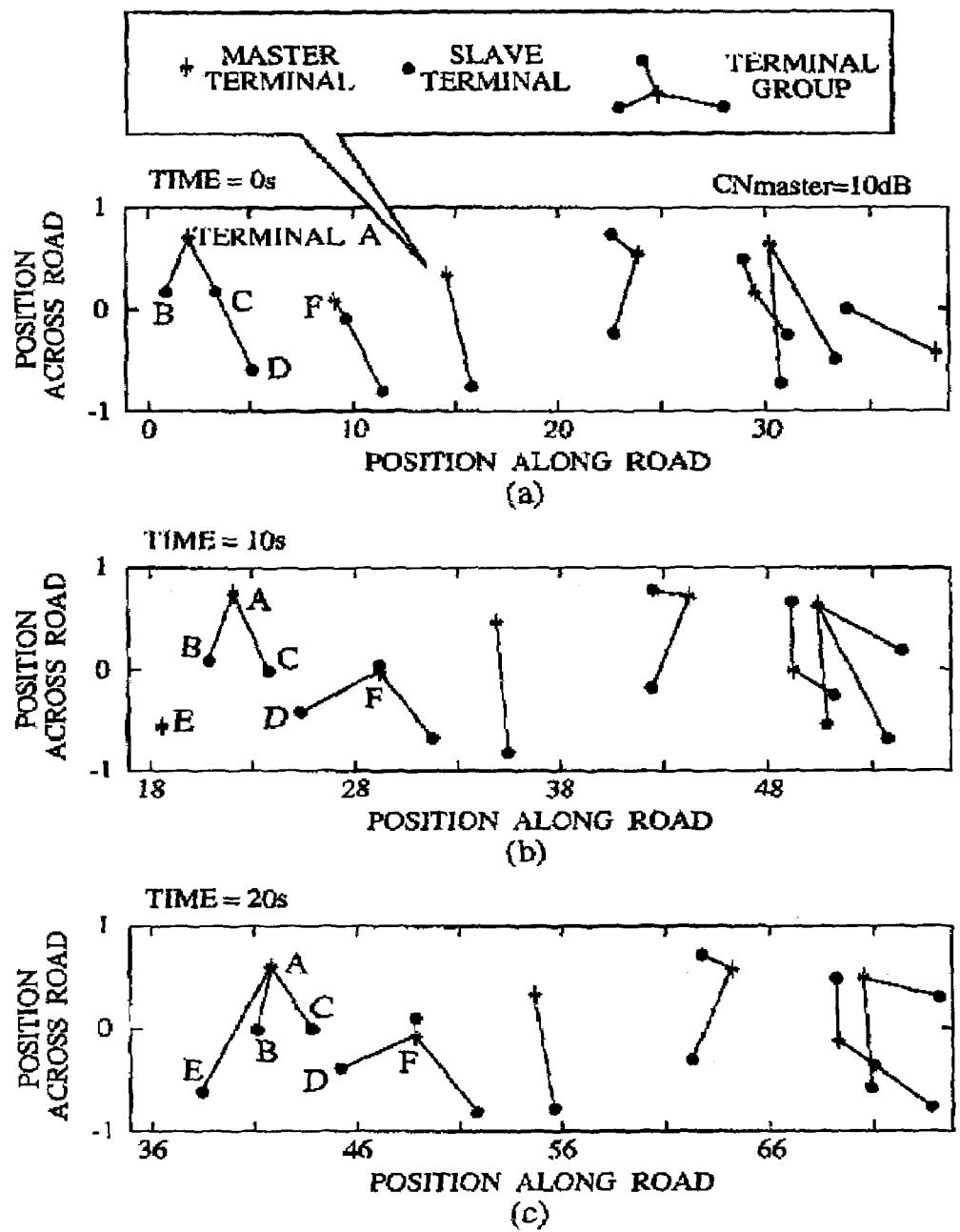
FIG. 4 is an explanatory diagram showing the results of a simulation of how a terminal group is constructed.

FIG. 4 is an explanatory diagram showing the results of a simulation of how the relationship between a master terminal (Master Terminal) and slave terminals (Slave Terminal) subordinate to the former and a terminal group (Terminal Group) constituted by them in a case where there are twenty wireless communication terminals 101.

FIG. 4 shows the passage of time in the order of (a), (b) and (c) and how the wireless communication terminals 101 have moved accordingly. It is seen from this diagram that a terminal group is autonomously constructed and, what is more, that terminal group is maintained for a substantial time. Therefore, efficient message transmission becomes possible by using a message relay scheme to be discussed later.

(Slot Structure)

Figure 5:
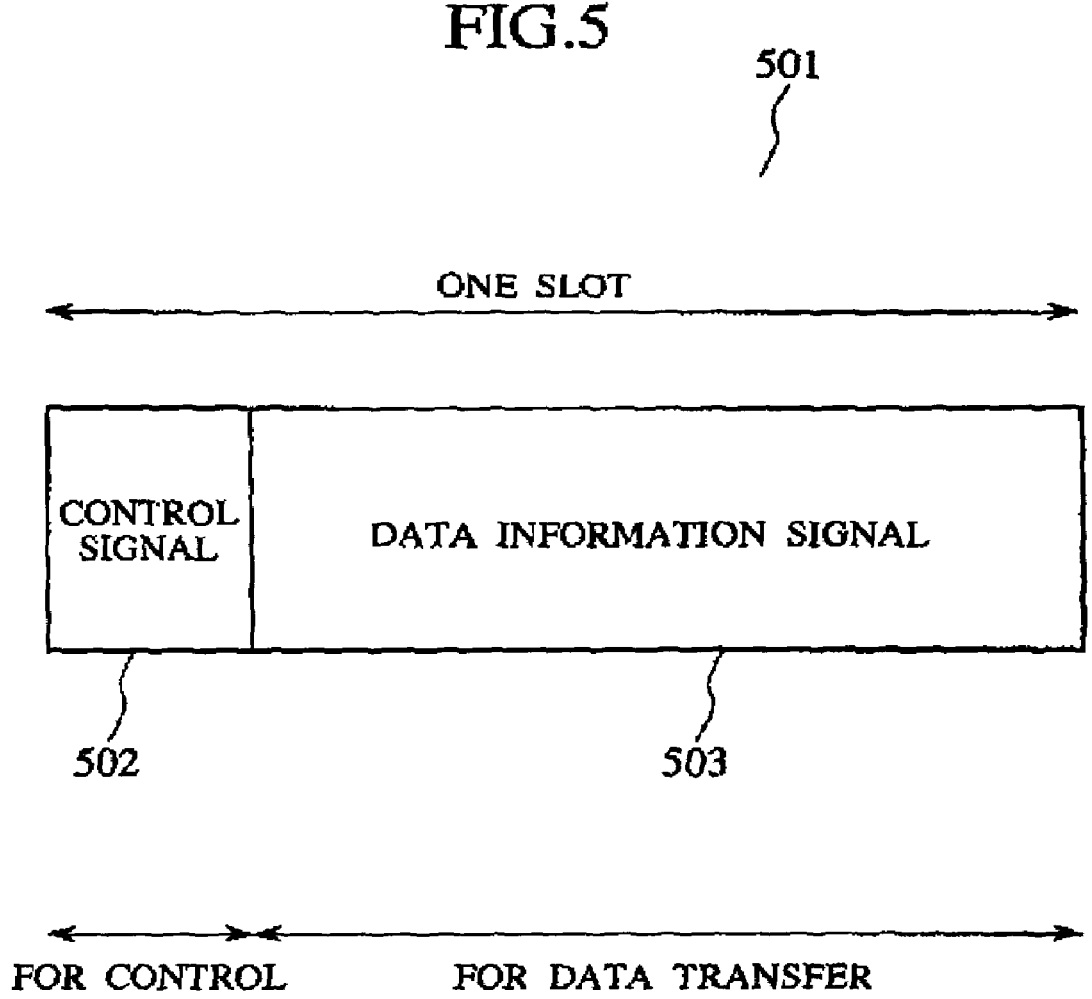
FIG. 5 is an exemplary diagram illustrating the structure of a slot to be used in transmission of data information.

In the embodiment, a message which is exchanged between the transmission section 113 and the reception section 114 is time-divided and transmitted slot by slot. FIG. 5 is an exemplary diagram illustrating the structure of a slot which is used in this embodiment.

A single slot 501 can be separated into two times, a control signal period 502 and a data transfer period 503.

In the control signal period 502, the following control signals are transmitted.

Destination message (Call Notification) which notifies information of a destination to be designated and to that effect that data information is to be transmitted to the destination.

Acknowledge message (ACK) which notifies to that effect that data information has been transmitted to the designated destination or a relay to the destination.

Not-acknowledge message (NACK) which notifies to that effect that a destination message has arrived but data information has not been transmitted.

Relay-offer message (Relay Offer) which notifies to that effect that transmission of data information may be relayed to the destination.

Inquiry message (Authentication Confirm). A slave station asks a master station to which it is subordinate if the destination is also subordinate.

Relay-approval message (Authentication Reply). A slave station gives a master station to which it is subordinate a notification to that effect the destination is also subordinate.

In the data transfer period 503, a data information signal is transmitted. While data information to be sent is transmitted by a data information signal, information, such as destination information or relay information, may be added and transmitted.

Because the amount of information to be transmitted in the control signal period 502 is small and the time is short, the instantaneous transmission power in the control signal period 502 may be made large. This can make the transmission distance for Call Notification or the like longer.

Because a relatively large amount of information is transmitted in the data transfer period 503, the maximum value of the instantaneous transmission power is limited and the distance of arrival is shorter than signals to be transmitted in the control signal period 502.

The following will discuss as an example the situation where data information is transmitted from a wireless communication terminal P (sender terminal) subordinate to another wireless communication terminal in a terminal group 1 to a wireless communication terminal (destination terminal) Q which is subordinate to both a wireless communication terminal Q and a wireless communication terminal R in a terminal group 2. Note that the following description can also be applied to a case where the wireless communication terminal P is a master terminal.

FIG. 6 is an explanatory diagram showing how a message is exchanged in case where data could be transmitted directly from the wireless communication terminal P (sender terminal) to the wireless communication terminal Q (destination terminal).

First, the wireless communication terminal P broadcasts Call Notification and then directly transmits data information (Direct Transmission).

Under this circumstance, because the wireless communication terminal Q could receive the directly transmitted data information, it returns ACK to the wireless communication terminal P.

As it is received, transmission of the data information in the wireless communication terminal P has completed successfully.

FIG. 7 is an explanatory diagram showing how a message is exchanged in case where data could be transmitted from the wireless communication terminal P (sender terminal) to the wireless communication terminal Q (destination terminal) via the wireless communication terminal R (relay terminal).

First, the wireless communication terminal P broadcasts Call Notification and then directly transmits data information (Direct Transmission). This is the same as done in the example illustrated in FIG. 6.

In case where the wireless communication terminal Q could receive Call Notification but failed receiving data information, the wireless communication terminal Q transmits NACK to the wireless communication terminal P. In case where the wireless communication terminal Q could receive neither Call Notification nor data information, nothing would be transmitted.

In such a case, i.e., in case where the wireless communication terminal P could not receive ACK from the wireless communication terminal, it checks it there is Relay Offer from another wireless communication terminal.

In this case, the wireless communication terminal R has transmitted Relay Offer to the effect that "transmission to the wireless communication terminal Q may be relayed" to the wireless communication terminal P.

The wireless communication terminal R understood that the wireless communication terminal Q was its own slave terminal as a result of having seen the information of the destination (wireless communication terminal Q) included in Call Notification sent in the broadcasting and that relay there would be possible, and thus returned Relay Offer.

Therefore, the wireless communication terminal P transmits data information addressed to the wireless communication terminal Q to the wireless communication terminal R. In the embodiment, a direct transmission system, not broadcasting system, is used in the transmission of data information.

The wireless communication terminal R returns ACK to the wireless communication terminal P, notifying that this data information has been received. This completes transmission in the wireless communication terminal P successfully.

Further, the wireless communication terminal R performs direct transmission of Call Notification and data information to the wireless communication terminal Q, and transmission in the wireless communication terminal P is completed successfully as ACK is returned to the wireless communication terminal R from the wireless communication terminal Q.

At the same time, as the wireless communication terminal Q returns ACK (Finish) to the wireless communication terminal P, the entire relaying completes successfully.

In this manner, ACK (Finish) is also returned to the wireless communication terminal P from the wireless communication terminal Q. This is because, as described above, signals to be transmitted in the control signal period 502 have a long distance of arrival, ACK can be returned even though data information cannot be transmitted. This can allow the sender to confirm that data information has been transmitted to the destination as done in the TCP (Transfer Control Protocol).

Although Relay Offer is returned only from the wireless communication terminal R in the diagram, the wireless communication terminal P may receive a plurality of Relay offers. The one that has the maximum transmission power is selected from among them and data information is directly transmitted only to that party and the party is allowed to relay it.

Figure 8:
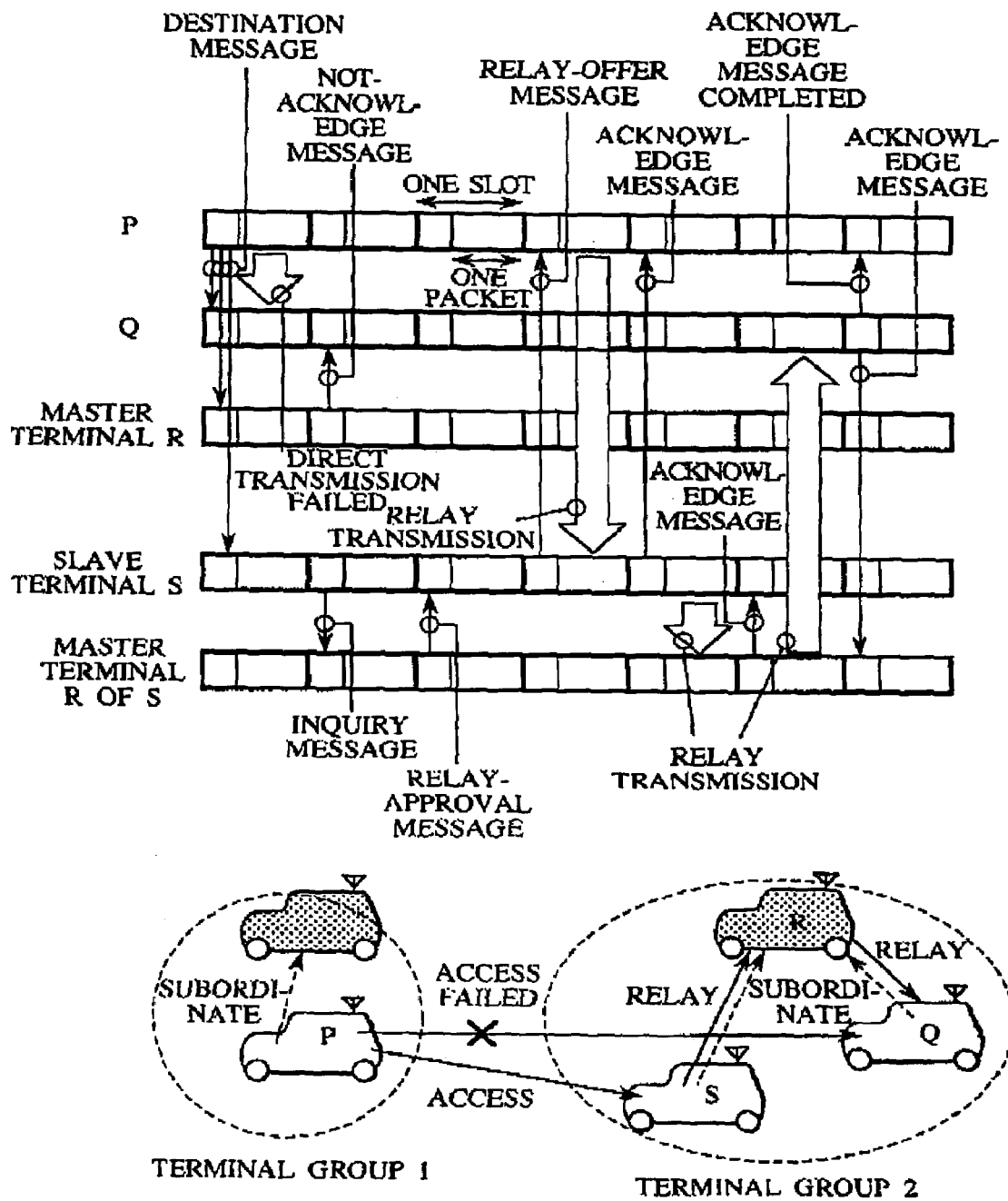
FIG. 8 is an explanatory diagram showing how transmission from a sender terminal to a destination terminal which belongs to a different terminal group is carried out via a relay terminal which is a master terminal of the destination terminal and a sub relay terminal which is a slave terminal of the relay terminal.

FIG. 8 is an explanatory diagram showing how a message is exchanged in case where data could be transmitted from the wireless communication terminal P (sender terminal) to the wireless communication terminal Q (destination terminal) via the wireless communication terminal S (sub relay terminal) and the wireless communication terminal R (relay terminal).

First, the wireless communication terminal P broadcasts Call Notification and then directly transmits data information (Direct Transmission). This is the same as done in the example illustrated in FIG. 6 and FIG. 7.

In case where the wireless communication terminal Q could receive Call Notification but failed receiving data information, the wireless communication terminal Q transmits NACK to the wireless communication terminal P. In case where the wireless communication terminal Q could receive neither Call Notification nor data information, nothing would be transmitted.

In such a case, i.e., in case where the wireless communication terminal P could not receive ACK from the wireless communication terminal, it waits for Relay Offer from another wireless communication terminal.

Meanwhile, the wireless communication terminal S that has received Call Notification makes an inquiry "Is the wireless communication terminal Q a slave terminal of the wireless communication terminal R?" to the wireless communication terminal R (Authentication Confirm).

In response to that, the wireless communication terminal R returns "As the wireless communication terminal Q is the slave terminal of the wireless communication terminal R, transmission to the wireless communication terminal Q may be relayed" (Authentication Reply) to the wireless communication terminal P.

Accordingly, the wireless communication terminal S transmits Relay Offer to the effect that "transmission to the wireless communication terminal Q may be relayed" to the wireless communication terminal P.

Then, the wireless communication terminal P transmits data information addressed to the wireless communication terminal Q to the wireless communication terminal R.

The wireless communication terminal S returns ACK to the wireless communication terminal P, notifying that this data information has been received. This completes transmission in the wireless communication terminal P successfully.

Further, the wireless communication terminal S performs direct transmission of data information to the wireless communication terminal R, and relaying during this period is completed successfully as ACK is returned to the wireless communication terminal S from the wireless communication terminal R.

Furthermore, the wireless communication terminal R performs direct transmission of data information to the wireless communication terminal Q, and relaying is completed successfully as ACK is returned to the wireless communication terminal R from the wireless communication terminal Q.

At the same time, as the wireless communication terminal Q returns ACK (Finish) to the wireless communication terminal P, the entire relaying completes successfully.

Communication within the same terminal group can be realized by applying the above-described transmission system similarly.

It is possible to employ such an embodiment in which the sender terminal does not wait for ACK returned from the destination that is located at the relayed terminal in case where relaying is carried out. For example, although data transmission to the wireless communication terminal Q is completed successfully as the wireless communication terminal P receives ACK (Finish) last in the modes shown in FIG. 7 and FIG. 8, the embodiment is such that data transmission from the wireless communication terminal P is made to any wireless communication terminal and data transmission is completed successfully as ACK from that wireless communication terminal is received.

Such data transmission does not guarantee, as in the UDP (User Datagram Protocol), that a packet reliably reaches the party, but has a characteristic such that fast transmission is possible.

Although a data information message and other messages are transmitted in a time-divisional manner in this embodiment, the above-described scheme can be applied similarly even in the frequency division or code division and those embodiments are included in the scope of the invention.

(Experimental Results)

Figure 9:
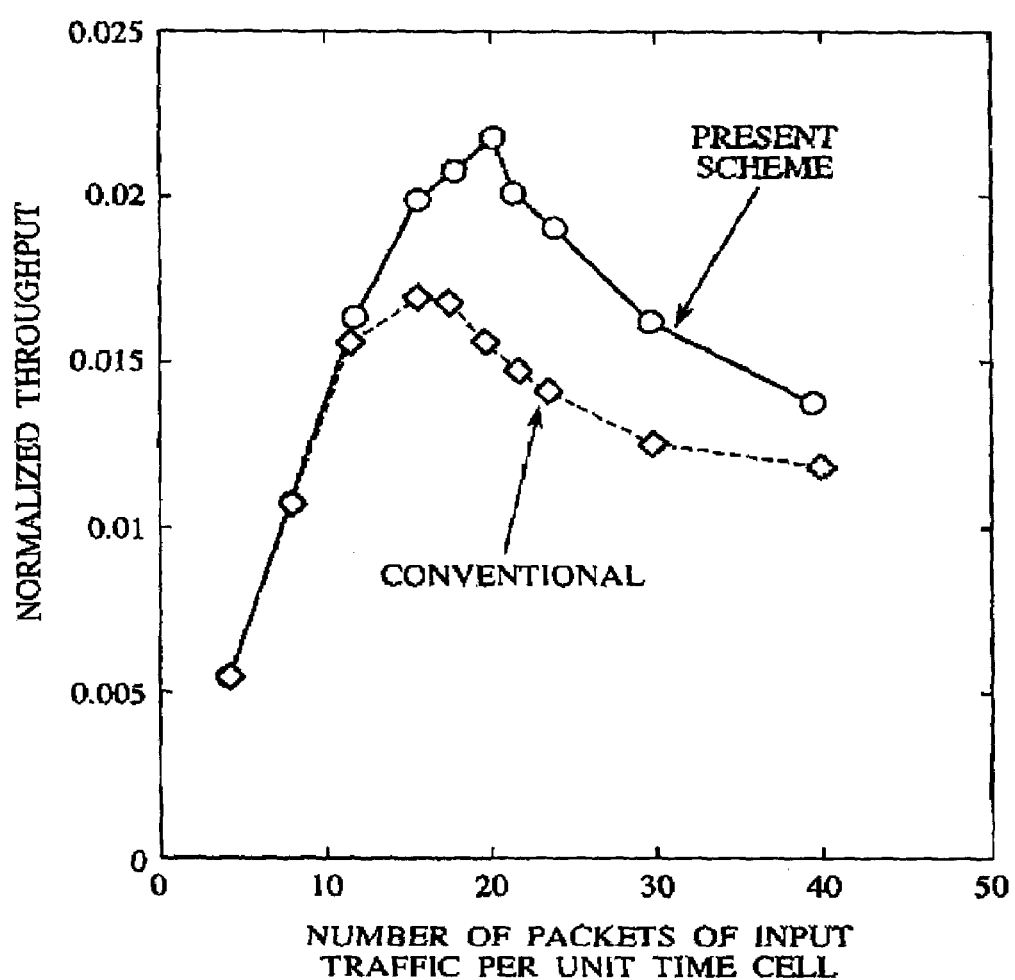
FIG. 9 is a graph showing the results of an experiment on the relationship between the input traffic and communication throughput.

FIGS. 9 and 10 are graphs which respectively show the results of experiments on the relationship among the input traffic (Input Traffic) communication throughput (Normalized Throughput) and communication delay (Normalized Delay) in the case where the scheme of the embodiment is used (Proposed) and in the case where the conventional scheme is used (Conventional).

It is seen that the use of the embodiment has improved the communication throughput and shortened the communication delay.

(Second Embodiment)

This embodiment is to further change the transmission mode of a signal in accordance with the status of the radio wave propagation path at the time each wireless communication terminal transmits a signal, in addition to the above-described embodiment.

The status of the radio wave propagation path can be expressed by parameters which indicate the following information.

Reception power

Distance and direction between the sender terminal and receiver terminal

Use status of the frequency channel

Designation by user

The transmission mode can be expressed by parameters which indicate the following information.

Transmission power

Frequency channel to be used in transmission

Modulation type

Beam shape

While a single master terminal and a plurality of slave terminals form a terminal group having a star-like relationship in the embodiment, it is expected that they have a radio wave propagation path better than a predetermined reference.

It is therefore possible to suppress consumption of the transmission power as much as possible and ensure reliable transmission by adequately grasping the status of the radio wave propagation path between a terminal group and a terminal group and changing the transmission mode according to the status.

Specifically, at the time each terminal sends out Relay offer in response to Call Notification, the status of the radio wave propagation path at the time of receiving the Call Notification is measured first. Then, information of the reception status parameter that expresses the measuring result is designated in the Relay offer and is returned to the sender terminal.

The sender terminal acquires the reception status parameter designated in the received Relay Offer and sends a message using a transmission parameter corresponding to the reception status parameter to request relaying to the sender of the Relay Offer.

In the embodiment, broadcasting is used for transmission of Call Notification and direct transmission is used for the accompanied transmission of data information. Therefore, the former has greater transmission power than the latter. In the embodiment, therefore, the transmission power at the time of direct transmission is made as low as possible.

It is fine if direct transmission succeeds with the minimum transmission power required, but in case where direct transmission has failed, transmission is carried out using the transmission mode according to the the status of the radio wave propagation path between the sender terminal and the relay terminal. For example, the transmission power may be changed in proportional to the reception power designated in Relay Offer or according to the reception power, the beam shape may be changed to the direction designated in Relay Offer or a frequency channel other than the "frequency channel currently in use" designated in Relay offer may be used.

Therefore, the communication capacity of the entire system can be improved in addition to reduction of the consumption power.

Figure 11A:
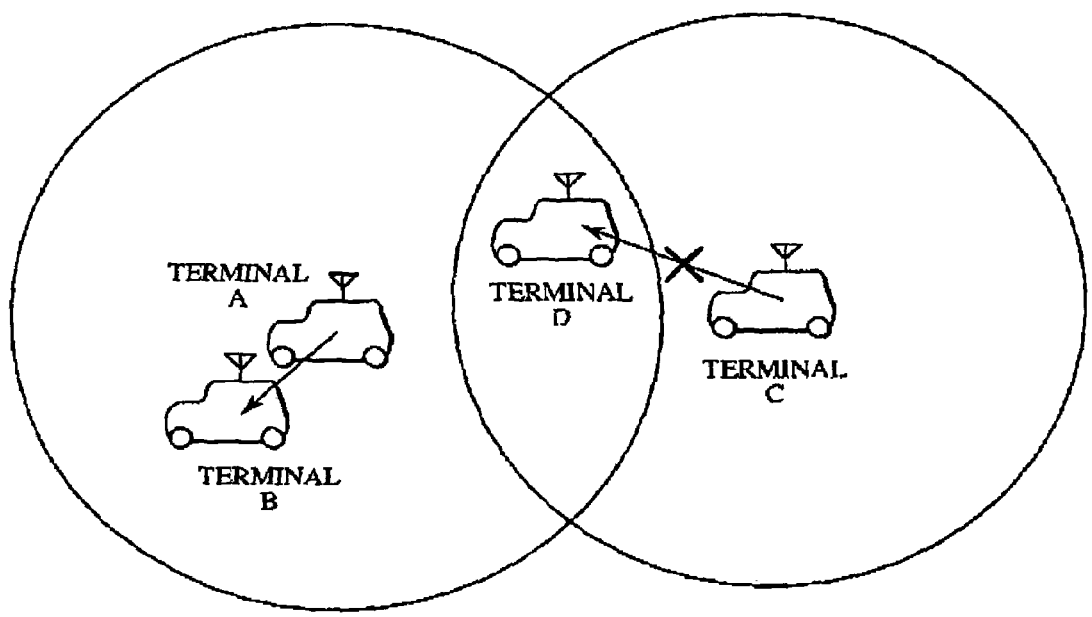
FIG. 11 is an explanatory diagram showing whether communication among wireless communication terminals succeeds or riot depending on whether or not communication power control is executed.
Figure 11B:
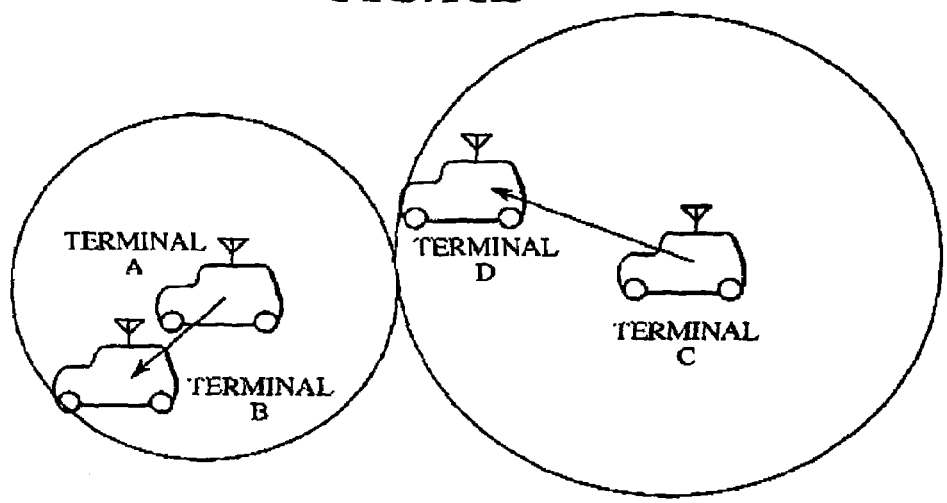

FIG. 11 is an explanatory diagram of the comparison between (a) a case where transmission power control is not used and (b) a case where transmission power control is used. The circles in the diagram indicate the ranges over which radio waves reach, and the terminal A has already communicated with the terminal B and the terminal C is trying to communication with the terminal D.

In the case where transmission power control is not used, as shown in FIG. 6(a), the radio wave from the terminal A has also reached the terminal D, and it becomes interference to communication from the terminal C to the terminal D. Therefore, communication from the terminal C to the terminal D will not succeed.

In the case where transmission power control is used, as shown in FIG. 6(b), on the other hand, the terminal A makes transmission with the minimum transmission power required, so that the radio wave from the terminal A does not reach the terminal D. Therefore, communication from the terminal C to the terminal D will succeed. That is, the communication capacity of the entire system has been improved.

Figure 12A:
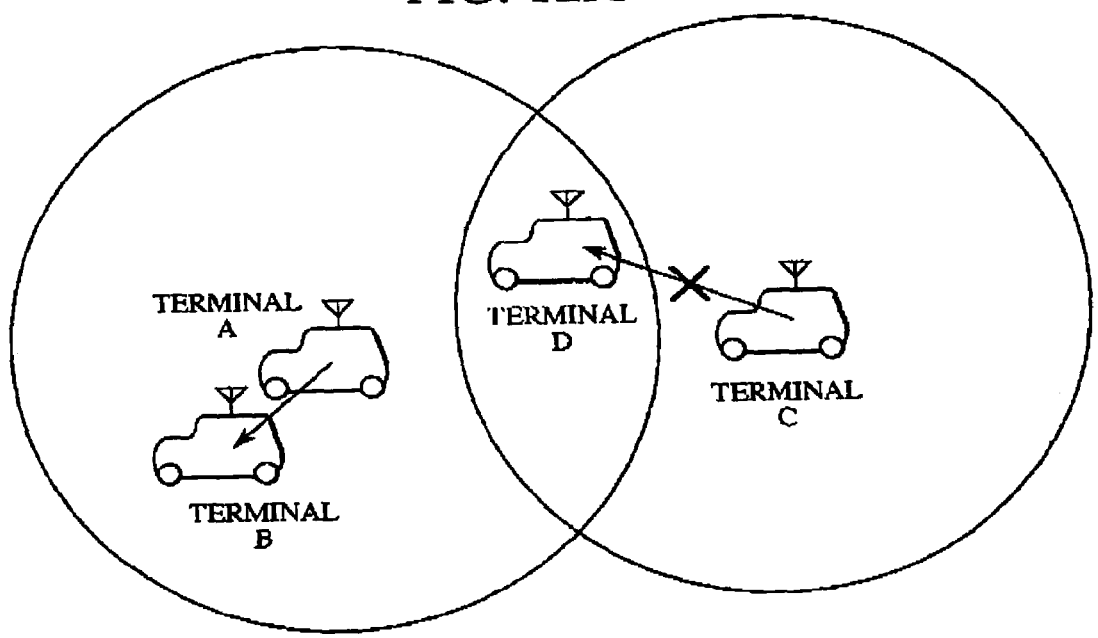
FIG. 12 is an explanatory diagram showing whether communication among wireless communication terminals succeeds or not depending on whether or not communication beam shape control is executed.
Figure 12B:
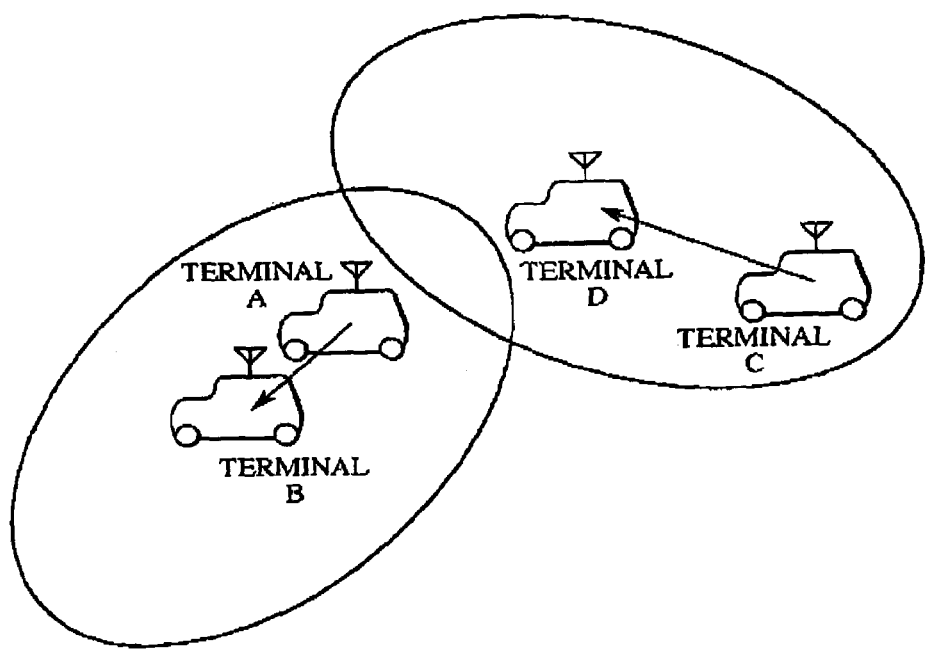
Figure 13A:
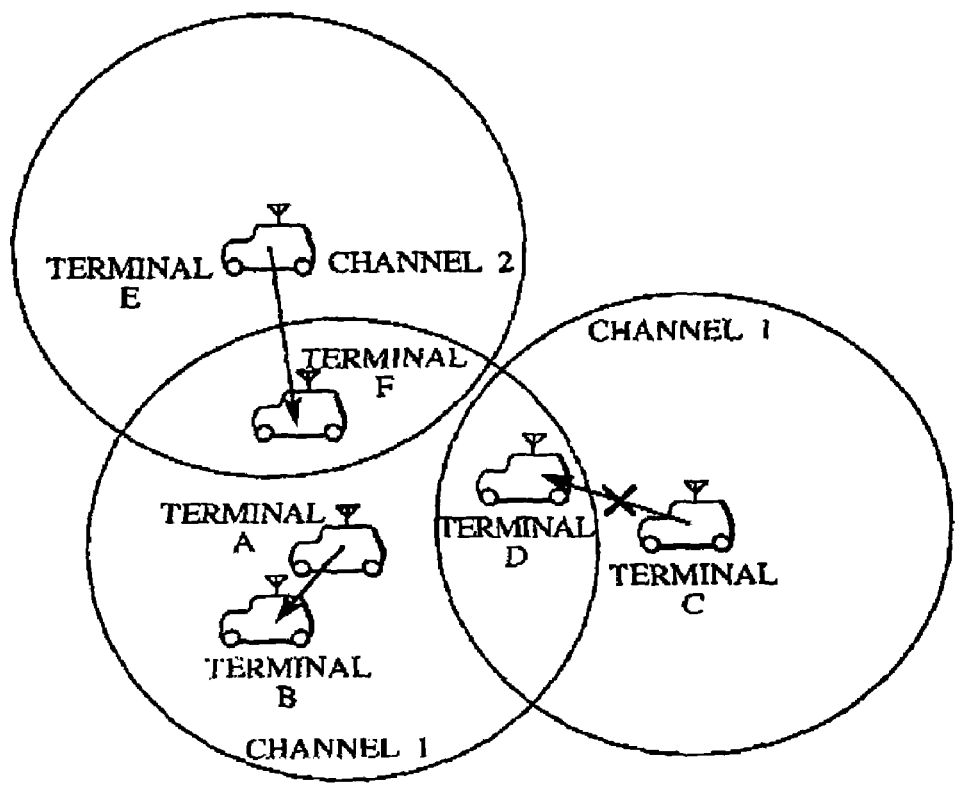
FIG. 13 is an explanatory diagram showing whether communication among wireless communication terminals succeeds or not depending on whether or not communication channel shape control is executed.
Figure 13B:
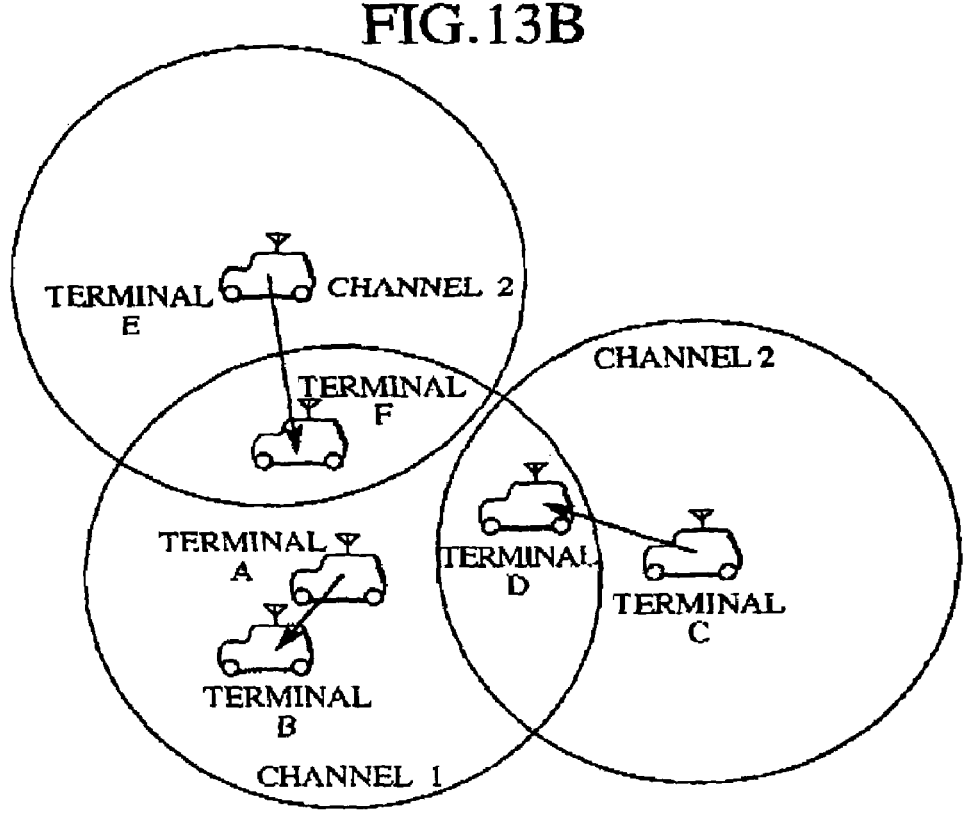

FIG. 12 is an explanatory diagram in a case where the beam shape is changed in accordance with the position of a terminal to be communicated, and FIG. 13 is an explanatory diagram in a case where the frequency channel to be used is changed in accordance with the use status of the current communication channel, Although the case (a) where control is not performed and the case (b) where control is performed are illustrated in them, it is understood, as in the above-described example, that the communication capacity of the entire system has improved in the case where control is performed as compared with the case where control is not performed.

Figure 14:
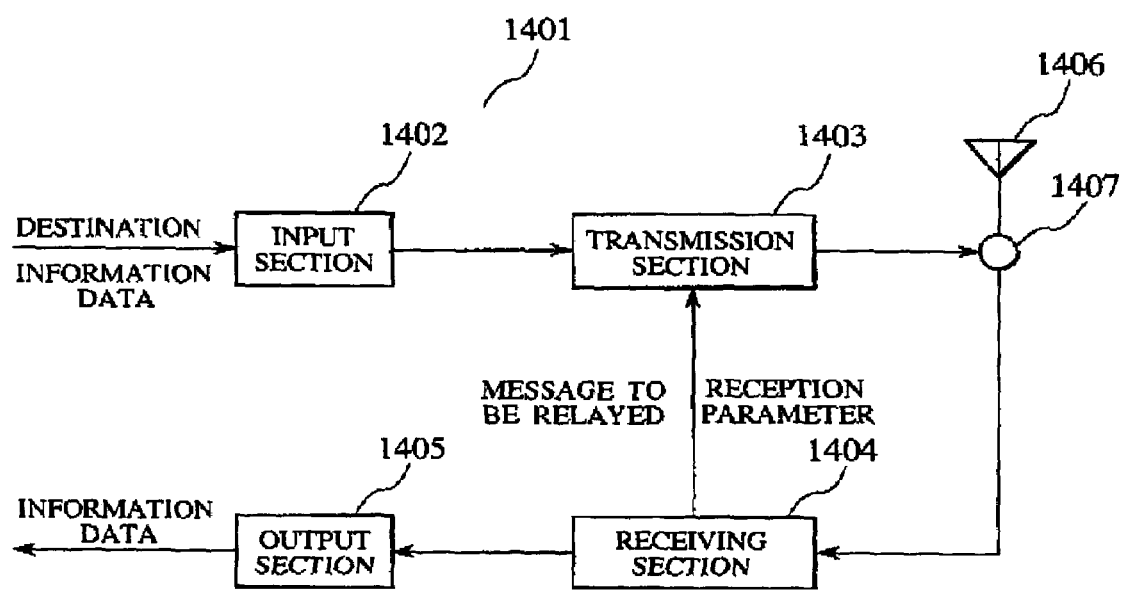
FIG. 14 is an exemplary diagram illustrating the schematic structure of a wireless communication terminal which performs communication control.

FIG. 14 is an exemplary diagram illustrating the schematic structure of a wireless communication terminal which performs the communication control of the embodiment that has been described above. The wireless communication terminal illustrated in the diagram is applied in a case where the invention is adapted to other wireless communication terminals than the above-described embodiment. A description will be given below by referring to this diagram.

A wireless communication terminal 1401 has an input section 1402, a transmission section 1403, a reception section 1404, an output section 1405, an antenna 1406, and a directional coupler 1407. The transmission section 1402 transmits various kinds of messages via the directional coupler 1407 and the antenna 1406. The reception section 1404 receives various kinds of messages via the antenna 1406 and the directional coupler 1407.

First, the input section 1402 accepts inputting of a destination terminal and data information addressed to the destination terminal.

Then, the transmission section 1403 transmits a destination data information message which designates the destination terminal, whose input has been accepted by the input section 1402, and data information addressing that as a destination terminal using a predetermined transmission parameter (including the parameter of transmission power, the parameter of the frequency channel to be used in transmission, the parameter of the modulation system, the parameter of the beam shape).

In this transmission using the predetermined transmission parameter, as described above, of the message,
  the portion that designates the destination terminal is transmitted in broadcasting, and
  the portion that designates data information is transmitted with the minimum transmission power required.

That is, the transmission power of the latter is lower than that of the former. Up to this is the first stage in transmission.

In case where transmission has not succeeded through it and the reception section 1404 has received a relay-offer message, the transmission section 1403 transmits the destination data information message to the sender terminal of the relay-offer message using the transmission parameter that is associated with the reception status parameter designated in the relay-offer message.

This is equivalent to the case in the above-described embodiment where Relay Offer is received, a message is transmitted to the terminal which is requested to relay by adjusting the transmission power, beam shape, frequency channel, etc. using the transmission parameter corresponding to the reception status parameter designated in the relay-offer message.

In case of performing reception, when the reception section 1404 has received "a destination data information message addressing the local as a destination terminal", the transmission section 1405 outputs the data information.

In case where the reception section 1404 has received "a destination data information message addressing another wireless communication terminal (hereinafter called "relayable terminal") to which the local can relay communication", a "relay-offer message which designates the reception status parameter at the time the destination data information message has been received (including the parameter of reception power, the parameter of the use status of the frequency channel or the parameter of the distance and direction to the sender terminal of the destination data information message) is transmitted.

This is equivalent to the case in the above-described example where communication to another wireless communication terminal in a terminal group to which the wireless communication terminal 1401 belongs is detected and Relay Offer is returned to it.

Thereafter, in case where the reception section 1404 has received a 'destination data information message designating data information addressing, as a destination terminal, "a relayable terminal targeted for the relay-offer message transmitted earlier by the transmission section", the transmission section 1403 transmits the destination data information message to the relayable terminal for relaying.

This is equivalent to the case in the above-described example where if the wireless communication terminal 1401 is a master station, a message is transmitted to the relayable terminal directly, and if it is a slave station, a message is relayed via the master station to the relayable terminal.

In this manner, the communication capacity of the communication system can be improved by adequately performing communication control in a wireless communication terminal which can relay to another terminal.

INDUSTRIAL APPLICABILITY

As described above, the invention can provide a wireless communication terminal and a wireless communication method which are suitable to be able to ensure communication by carrying out relay even in wireless communication using a frequency band suitable for line-of-sight communication even if an obstruction is present in the path of wireless communication and even if the status of the radio wave propagation path dynamically changes, and a computer readable information recording medium in which a program for achieving them is recorded.

The invention claimed is:

1. A wireless communication terminal which operates in operation modes including an undetermined mode, a master station mode and a slave station mode and is characterized by comprising:
  an initial detecting section which detects if communication with another wireless communication terminal that operates in the master station mode is possible in case where an operation mode is set to the undetermined mode;
  a slave-mode setting section which, in case where it is detected by said initial detecting section that communication with another wireless communication terminal which operates in the master station mode is possible, sets the operation mode to the slave station mode registers the another wireless communication terminal as a master terminal and transmits subordination information to the effect that the local is subordinate to the master terminal;
  a master-mode setting section which sets the operation mode to the master station mode in case where it is detected by said initial detecting section that communication with the another wireless communication terminal which operates in the master station mode is not possible;
  a slave terminal registration section which registers said another wireless communication terminal as a slave terminal in case where the operation mode is set to the master station mode and subordination information to the effect that the another wireless communication terminal which operates in the master station mode is subordinate to the local is received;

a master station maintenance detection section which detects it communication with the another wireless communication terminal registered as the slave terminal is possible when the operation mode is set to the master station mode;

a slave station maintenance detection section which detects if communication with the another wireless communication terminal registered as the master terminal is possible when the operation mode is set to the slave station mode;

an undetermined-mode setting section which sets the operation mode to the undetermined mode in case where it is detected by said master station maintenance detection section that communication with the another wireless communication terminal registered as the slave terminal is not possible, or in case where it is detected by said slave station maintenance detection section that communication with the another wireless communication terminal registered as the master terminal is not possible or in case where the operation mode is set to the master station mode and no wireless communication terminal is registered as the slave terminal;

a transmission section which transmits a message to another wireless communication terminal; and a reception section which receives a message from another wireless communication terminal.

2. The wireless communication terminal according to claim 1, characterized in that said master station maintenance detection section does not perform detection until a time over which the operation mode has maintained the master station mode exceeds a predetermined time after it is detected by said master station maintenance detection section that communication with another wireless communication terminal registered as a slave terminal is possible.

3. The wireless communication terminal according to claim 1, characterized in that said slave station maintenance detection section does not perform detection until a time over which the operation mode has maintained the master station mode exceeds a predetermined time after it is detected by said slave station maintenance detection section that communication with another wireless communication terminal registered as a master terminal is possible.

4. The wireless communication terminal according to claim 1 (hereinafter called "sender terminal"), characterized in that in case where data information is transferred from the sender terminal to another wireless communication terminal (hereinafter called "destination terminal"), said transmission section transmits a destination message designating the destination terminal and a data information message designating the data information; and in case where an acknowledge message to the effect that said reception section has received the data information from the destination terminal could not be received and a relay-offer message to the effect transmission to the destination terminal will be relayed has been received from a wireless communication terminal other than the destination terminal (hereinafter called "relay terminal"), said transmission section transmits the data information message designating the data information and addressed to the destination terminal to the relay terminal.

5. The wireless communication terminal according to claim 4, characterized in that the transmission section transmits the data information message designating the data information addressed to the destination terminal to the relay terminal using a transmission parameter (including a parameter of transmission power, a parameter of a frequency channel to be used in transmission, a parameter of a modulation system, a parameter of a beam shape) corresponding to a reception status parameter (including a parameter of reception power, a parameter of a use status of a frequency channel or a parameter of a distance and direction to the sender terminal) designated in said relay-offer message.

6. The wireless communication terminal according to claim 1 (hereinafter called "destination terminal"), characterized in that in case where said reception section has received from another wireless communication terminal (hereinafter called "sender terminal") a destination message designating the destination terminal and a data information message designating data information addressed to the destination terminal, said transmission section transmits an acknowledge message to the effect that the data information has been received to the sender terminal.

7. The wireless communication terminal according to claim 1 (hereinafter called "destination terminal"), characterized in that in case where said reception section has received from another wireless communication terminal (hereinafter called "sender terminal") a destination message designating the destination terminal and has not received a data information message designating data information addressed to the destination terminal from the sender terminal, said transmission section transmits a not-acknowledge message to the effect that the data information has not been received to the sender terminal.

8. The wireless communication terminal according to claim 1 (hereinafter called "relay terminal"), characterized in that when the operation mode is set to the master station mode, in case where said reception section has received from another wireless communication terminal (hereinafter called "destination terminal") a destination message designating a wireless communication terminal registered as a slave terminal (hereinafter called "destination terminal"), said transmission section transmits to the sender terminal a relay-offer message to the effect that transmission to the destination terminal will be relayed, and further, in case where said reception section has received a data information message designating data information addressed to the destination terminal from the sender terminal, said transmission section transmits a destination message designating the destination terminal and a data information message designating the data information to the destination terminal.

9. The wireless communication terminal according to claim 8, characterized in that said relay-offer message designates a reception status parameter (including a parameter of reception power, a parameter of a use status of a frequency channel or a parameter of a distance and direction to the sender terminal) at a time the destination message has been received by the reception section.

10. The wireless communication terminal according to claim 1 (hereinafter called "relay terminal"), characterized in that when the operation mode is set to the master station mode, in case where said reception section has received from another wireless communication terminal registered as a slave terminal (hereinafter called "sub relay terminal") an inquiry message designating another wireless communication terminal registered (hereinafter called "destination terminal"), said transmission section transmits a relay-approval message to the sub relay terminal if the destination terminal is also registered as a slave terminal, and further, in case where said reception section has received a data information message designating data information addressed to the destination terminal from the sub relay terminal, said transmission section transmits a destination message designating the destination terminal and a data information message designating the data information to the destination terminal.

11. The wireless communication terminal according to claim 1 (hereinafter called "sub relay terminal"), characterized in that when the operation mode is set to the slave station mode, in case where said reception section has received from another wireless communication terminal (hereinafter called "sender terminal") a destination message designating another wireless communication terminal (hereinafter called "destination terminal"), said transmission section transmits an inquiry message designating the destination terminal to a wireless communication terminal registered as a master terminal (hereinafter called "relay terminal"), further, in case where said reception section has received a relay-approval message from the relay terminal, said transmission section transmits to the sender terminal a relay-offer message to the effect that transmission to the destination terminal will be relayed, and further, in case where said reception section has received a data information message designating data information addressed to the destination terminal from the sender terminal, said transmission section transmits a data information message designating the data information to the destination terminal to the relay terminal.

12. The wireless communication terminal according to claim 11, characterized in that said relay-offer message designates a reception status (including a parameter of reception power, a parameter of a use status of a frequency channel or a parameter of a distance and direction to the sender terminal) at a time the destination message has been received by the reception section.

13. The wireless communication terminal according to claim 1, characterized in that said data information message and other messages are transmitted in time divisional manner in transmission by said transmission section and said reception section.

14. A wireless communication method which uses on operation modes including an undetermined mode, a master station mode and a slave station mode and is characterized by comprising:

an initial detecting step which detects if communication with another wireless communication terminal that operates in the master station mode is possible in case where the operation mode is set to the undetermined mode;

a slave-mode setting step which, in case where it is detected in said initial detecting step that communication with another wireless communication terminal which operates in the master station mode is possible, sets the operation mode to the slave station mode, registers the another wireless communication terminal as a master terminal and transmits subordination information to the effect that the local is subordinate to the master terminal;

a master-mode setting step which sets the operation mode to the master station mode in case where it is detected in said initial detecting step that communication with the another wireless communication terminal which operates in the master station mode is not possible;

a slave terminal registration step which registers said another wireless communication terminal as a slave terminal in case where the operation mode is set to the master station mode and subordination information to the effect that the another wireless communication terminal which operates in the master station mode is subordinate to the local is received;

a master station maintenance detection step which detects if communication with the another wireless communication terminal registered as the slave terminal is possible when the operation mode is set to the master station mode;

a slave station maintenance detection step which detects if communication with the another wireless communication terminal registered as the master terminal is possible when the operation mode is set to the slave station mode; and an undetermined-mode setting step which sets the operation mode to the undetermined mode in case where it is detected in said master station maintenance detection step that communication with the another wireless communication terminal registered as the slave terminal is not possible, or in case where it is detected in said slave station maintenance detection step that communication with the another wireless communication terminal registered as the master terminal is not possible or in case where the operation mode is set to the master station mode and no wireless communication terminal is registered as the slave terminal.

15. The wireless communication method according to claim 14, characterized in that detection by said master station maintenance detection step is executed again in case where a time over which the operation mode has maintained the master station mode has exceeded a predetermined time since it was detected in said master station maintenance detection step that communication with another wireless communication terminal registered as a slave terminal would be possible.

16. The wireless communication method according to claim 14, characterized in that detection by said slave station maintenance detection step is executed again in case where a time over which the operation mode has maintained the master station mode has exceeded a pr determined time since it was detected in said slave station maintenance detection step that communication with another wireless communication terminal registered as a master terminal would be possible.

17. The wireless communication method according to claim 14, characterized in that in case where data information is transferred from a wireless communication terminal (hereinafter called "sender terminal") which performs the method to another wireless communication terminal (hereinafter called "destination terminal"), the method comprises:

a step of transmitting a destination message designating the destination terminal and a data information message designating the data information; and a step of, in case where an acknowledge message to the effect that the data information has been received from the destination terminal could not be received and a relay-offer message to the effect transmission to the destination terminal will be relayed has been received from a wireless communication terminal other than the destination terminal (hereinafter called "relay terminal"), transmitting the data information message designating the data information and addressed to the destination terminal to the relay terminal.

18. The wireless communication method according to claim 17, characterized in that in case of transmitting a data information message designating the data information addressed to the destination terminal to the relay terminal, the message is transmitted using a transmission parameter (including a parameter of transmission power, a parameter of a frequency channel to be used in transmission, a parameter of a modulation system, a parameter of a beam shape) corresponding to a reception status parameter (including a parameter of reception power, a parameter of a use status of a frequency channel or a parameter of a distance and direction to the sender terminal) designated in said relay-offer message.

19. The wireless communication method according to claim 14, characterized in that in a wireless communication terminal (hereinafter called "destination terminal") which performs the method, the method further comprises:
a step of, in case where a destination message designating the destination terminal and a data information message designating data information addressed to the destination terminal has been received from another wireless communication terminal (hereinafter called "sender terminal"), transmitting an acknowledge message to the effect that the data information has been received to the sender terminal.

20. The wireless communication method according to claim 14, characterized in that in a wireless communication terminal (hereinafter called "destination terminal") which performs the method, the method further comprises:
a step of, in case where a destination message designating the destination terminal has been received from another wireless communication terminal (hereinafter called "sender terminal") and a data information message designating data information addressed to the destination terminal has not been received from the sender terminal, transmitting a not-acknowledge message to the effect that the data information has not been received to the sender terminal.

21. The wireless communication method according to claim 14, characterized in that when the operation mode is set to the master station mode in a wireless communication terminal (hereinafter called "relay terminal") which performs the method, the method further comprises:
a step of, in case where a destination message designating a wireless communication terminal registered as a slave terminal (hereinafter called "destination terminal") has been received from another wireless communication terminal (hereinafter called "destination terminal"), transmitting to the sender terminal a relay-offer message to the effect that transmission to the destination terminal will be relayed, and
further, a step of, in case where a data information message designating data information addressed to the destination terminal has been received from the sender terminal, transmitting a destination message designating the destination terminal and a data information message designating the data information to the destination terminal.

22. The wireless communication method according to claim 21, characterized in that said relay-offer message designates a reception status parameter (including a parameter of reception power, a parameter of a use status of a frequency channel or a parameter of a distance and direction to the sender terminal) at a time the destination message has been received.

23. The wireless communication method according to claim 14, characterized in that when the operation mode is set to the master station mode in a wireless communication terminal (hereinafter called "relay terminal") which performs the method, the method further comprises:
a step of, in case where an inquiry message designating another wireless communication terminal registered (hereinafter called "destination terminal") has been received from another wireless communication terminal registered as a slave terminal (hereinafter called "sub relay terminal"), transmitting a relay-approval message to the sub relay terminal if the destination terminal is also registered as a slave terminal, and further, a step of, in case where a data information message designating data information addressed to the destination terminal has been received from the sub relay terminal, transmitting a destination message designating the destination terminal and a data information message designating the data information to the destination terminal.

24. The wireless communication method according to claim 14, characterized in that when the operation mode is set to the slave station mode in a wireless communication terminal (hereinafter called "sub relay terminal") which performs the method, the method further comprises:
a step of, in case where a destination message designating another wireless communication terminal (hereinafter called "destination terminal") has been received from another wireless communication terminal (hereinafter called "sender terminal"), transmitting an inquiry message designating the destination terminal to a wireless communication terminal registered as a master terminal (hereinafter called "relay terminal"),
further, a step of, in case where a relay-approval message has been received from the relay terminal, transmitting to the sender terminal a relay-offer message to the effect that transmission to the destination terminal will be relayed, and
further, a step of, in case where a data information message designating data information addressed to the destination terminal has been received from the sender terminal, transmitting a data information message designating the data information to the destination terminal to the relay terminal.

25. The wireless communication method according to claim 24, characterized in that said relay-offer message designates a reception status parameter (including a parameter of reception power, a parameter of a use status of a frequency channel or a parameter of a distance and direction to the sender terminal) at a time the destination message has been received.

26. The wireless communication method according to claim 14, characterized in that said data information message and other messages are transmitted in time divisional manner.

27. A program characterized by allowing a computer to function as a wireless communication terminal which operates in operation modes including an undetermined mode, a master station mode and a slave station mode and comprises:
an initial detecting section which detects if communication with another wireless communication terminal that operates in the master station mode is possible in case where an operation mode is set to the undetermined mode;
a slave-mode setting section which, in case where it is detected by said initial detecting section that communication with another wireless communication terminal which operates in the master station mode is possible, sets the operation mode to the slave station mode, registers the another wireless communication terminal as a master terminal and transmits subordination information to the effect that the local is subordinate to the master terminal;

a master-mode setting section which sets the operation mode to the master station mode in case where it is detected by said initial detecting section that communication with the another wireless communication terminal which operates in the master station mode is not possible;

a slave terminal registration section which registers said another wireless communication terminal as a slave terminal in case where the operation mode is set to the master station mode and subordination information to the effect that the another wireless communication terminal which operates in the master station mode is subordinate to the local is received;

a master station maintenance detection section which detects if communication with the another wireless communication terminal registered as the slave terminal is possible when the operation mode is set to the master station mode;

a slave station maintenance detection section which detects if communication with the another wireless communication terminal registered as the master terminal is possible when the operation mode is set to the slave station mode;

an undetermined-mode setting section which sets the operation mode to the undetermined mode in case where it is detected by said master station maintenance detection section that communication with the another wireless communication terminal registered as the slave terminal is not possible, or in case where it is detected by said slave station maintenance detection section that communication with the another wireless communication terminal registered as the master terminal is not possible or in case where the operation mode is set to the master station mode and no wireless communication terminal is registered as the slave terminal;

a transmission section which transmits a message to another wireless communication terminal; and a reception section which receives a message from another wireless communication terminal.

28. The program according to claim 27, characterized in that in said computer, said program functions in such a way that said master station maintenance detection section does not perform detection until a time over which the operation mode has maintained the master station mode exceeds a predetermined time after it is detected by said master station maintenance detection section that communication with another wireless communication terminal registered as a slave terminal is possible.

29. The program according to claim 27, characterized in that in said computer, said program functions in such a way that said slave station maintenance detection section does not perform detection until a time over which the operation mode has maintained the master station mode exceeds a predetermined time after it is detected by said slave station maintenance detection section that communication with another wireless communication terminal registered as a master terminal is possible.

30. The program according to claim 27, characterized in that in said computer, said program functions as a wireless communication terminal (hereinafter called "sender terminal") in which in case where data information is transferred from the sender terminal to another wireless communication terminal (hereinafter called "destination terminal"), said transmission section transmits a destination message designating the destination terminal and a data information message designating the data information; and in case where an acknowledge message to the effect that said reception section has received the data information from the destination terminal could not be received and a relay-offer message to the effect transmission to the destination terminal will be relayed has been received from a wireless communication terminal other than the destination terminal (hereinafter called "relay terminal"), said transmission section transmits the data information message designating the data information and addressed to the destination terminal to the relay terminal.

31. The program according to claim 30, characterized by functioning the computer in such a way that the transmission section transmits the data information message designating the data information addressed to the destination terminal to the relay terminal using a transmission parameter (including a parameter of transmission power, a parameter of a frequency channel to be used in transmission, a parameter of a modulation system, a parameter of a beam shape) corresponding to a reception status parameter (including a parameter of reception power, a parameter of a use status of a frequency channel or a parameter of a distance and direction to the sender terminal) designated in said relay-offer message.

32. The program according to claim 27, characterized in that in said computer, said program functions as a wireless communication terminal (hereinafter called "destination terminal") in which in case where said reception section has received from another wireless communication terminal (hereinafter called "sender terminal") a destination message designating the destination terminal and a data information message designating data information addressed to the destination terminal, said transmission section transmits an acknowledge message to the effect that the data information has been received to the sender terminal.

33. The program according to claim 27, characterized in that in said computer, said program functions as a wireless communication terminal (hereinafter called "destination terminal") in which in that in case where said reception section has received from another wireless communication terminal (hereinafter called "sender terminal") a destination message designating the destination terminal and has not received a data information message designating data information addressed to the destination terminal from the sender terminal, said transmission section transmits a not-acknowledge message to the effect that the data information has not been received to the sender terminal.

34. The program according to claim 27, characterized in that in said computer, said program functions as a wireless communication terminal (hereinafter called "relay terminal"), when the operation mode is set to the master station mode, in which in case where said reception section has received from another wireless communication terminal (hereinafter called "destination terminal") a destination message designating a wireless communication terminal registered as a slave terminal (hereinafter called "destination terminal"), said transmission section transmits to the sender terminal a relay-offer message to the effect that transmission to the destination terminal will be relayed, and further, in case where said reception section has received a data information message designating data information addressed to the destination terminal from the sender terminal, said transmission section transmits a destination message designating the destination terminal and a data information message designating the data information to the destination terminal.

35. The program according to claim 34, characterized by functioning the computer in such a way that said relay-offer message designates a reception status parameter (including a parameter of reception power, a parameter of a use status of a frequency channel or a parameter of a distance and direction to the sender terminal) at a time the destination message has been received by the reception section.

36. The program according to claim 27, characterized in that in said computer, said program functions as a wireless communication terminal (hereinafter called "relay terminal"), when the operation mode is set to the master station mode, in which in case where said reception section has received from another wireless communication terminal registered as a slave terminal (hereinafter called "sub relay terminal") an inquiry message designating another wireless communication terminal registered (hereinafter called "destination terminal"), said transmission section transmits a relay-approval message to the sub relay terminal if the destination terminal is also registered as a slave terminal, and further, in case where said reception section has received a data information message designating data information addressed to the destination terminal from the sub relay terminal, said transmission section transmits a destination message designating the destination terminal and a data information message designating the data information to the destination terminal.

37. The program according to claim 27, characterized in that in said computer, said program functions as a wireless communication terminal (hereinafter called "sub relay terminal"), when the operation mode is set to the slave station mode, in which in case where said reception section has received from another wireless communication terminal (hereinafter called "sender terminal") a destination message designating another wireless communication terminal (hereinafter called "destination terminal"), said transmission section transmits an inquiry message designating the destination terminal to a wireless communication terminal registered as a master terminal (hereinafter called "relay terminal"), further, in case where said reception section has received a relay-approval message from the relay terminal, said transmission section transmits to the sender terminal a relay-offer message to the effect that transmission to the destination terminal will be relayed, and further, in case where said reception section has received a data information message designating data information addressed to the destination terminal from the sender terminal, said transmission section transmits a data information message designating the data information to the destination terminal to the relay terminal.

38. The program according to claim 37, characterized by functioning the computer in such a way that said relay-offer message designates a reception status parameter (including a parameter of reception power, a parameter of a use status of a frequency channel or a parameter of a distance and direction to the sender terminal) at a time the destination message has been received by the reception section.

39. The program according to claim 27, characterized in that in said computer, said program functions in such a way that said data information message and other messages are transmitted in time divisional manner in transmission by said transmission section and said reception section.

40. A wireless communication terminal (hereinafter called "local") capable of relaying communication to another wireless communication terminal and having an input section, a transmission section, a reception section and an output section, characterized in that (a) said input section accepts inputting of a destination terminal and data information addressed to the destination terminal, (b) said transmission section transmits a destination data information message designating the destination terminal inputting of whose has been accepted and the data information addressed it as a destination terminal using a predetermined transmission parameter (including a parameter of transmission power, a parameter of a frequency channel to be used in transmission, a parameter of a modulation system, a parameter of a beam shape), (c) said output section outputs the data information when said reception section has received a 'destination data information message addressing the local', (d) when said reception section has received a 'destination data information message addressing, as a destination terminal, another wireless communication terminal (hereinafter called "relayable terminal") to which the local can relay communication', a 'relay-offer message designating a reception status parameter (including a parameter of reception power, a parameter of a use status of a frequency channel or a parameter of a distance and direction to the sender terminal) at a time the destination data information message has been received' is transmitted, (e) when said reception section has received the relay-offer message, said transmission section transmits the destination data information message to that terminal which has sent the relay-offer message, by using a transmission parameter associated with the reception status parameter designated in the relay-offer message, and (f) when said reception section has received a 'destination data information message designating data information addressing, as a destination terminal, "a relayable terminal targeted for the relay-offer message transmitted earlier by said transmission section", said transmission section transmits the destination data information message to the relayable terminal.

41. The wireless communication terminal according to claim 40, characterized in that in case where said transmission section transmits the destination data information message using said predetermined transmission parameter, transmission power for transmitting that portion in the destination data information message which designates the data information is lower than transmission power for transmitting that portion which designates the destination terminal.

42. A wireless communication method in which a predetermined wireless communication terminal (hereinafter called "local") is set beforehand and which can relay communication to another wireless communication terminal other than that terminal, characterized by comprising:

(a) a step of accepting inputting of a destination terminal and data information addressed to the destination terminal, (b) a step of transmitting a destination data information message designating the destination terminal inputting of whose has been accepted and the data information addressed it as a destination terminal using a predetermined transmission parameter (including a parameter of transmission power, a parameter of a frequency channel to be used in transmission, a parameter of a modulation system, a parameter of a beam shape), (c) a step of outputting the data information when a 'destination data information message addressing the local' has been received, (d) a step of, when a 'destination data information message addressing, as a destination terminal, another wireless communication terminal (hereinafter called "relayable terminal") to which the local can relay communication' has been received, transmitting a 'relay-offer message designating a reception status parameter (including a parameter of reception power, a parameter of a use status of a frequency channel or a parameter of a distance and direction to the sender terminal) at a time the destination data information message has been received' is transmitted, (e) a step of, when the relay-offer message has been received, transmitting the destination data information message to that terminal which has sent the relay-offer message, by using a transmission parameter associated with the reception status parameter designated in the relay-offer message, and (f) a step of, when a 'destination data information message designating data information addressing, as a destination terminal has been received, "a relayable terminal targeted for the relay-offer message transmitted earlier by said transmission section", transmitting the destination data information message to the relayable terminal.

43. The wireless communication method according to claim 42, characterized in that in case of transmitting the destination data information message using said predetermined transmission parameter, transmission power for transmitting that portion in the destination data information message which designates the data information is lower than transmission power for transmitting that portion which designates the destination terminal.

44. A program for allowing a computer to function as a wireless communication terminal (hereinafter called "local") capable of relaying communication to another wireless communication terminal and having an input section, a transmission section, a reception section and an output section, characterized in that (a) said input section accepts inputting of a destination terminal and data information addressed to the destination terminal, (b) said transmission section transmits a destination data information message designating the destination terminal inputting of whose has been accepted and the data information addressed it as a destination terminal using a predetermined transmission parameter (including a parameter of transmission power, a parameter of a frequency channel to be used in transmission, a parameter of a modulation system, a parameter of a beam shape), (c) said output section outputs the data information when said reception section has received a 'destination data information message addressing the local', (d) when said reception section has received a 'destination data information message addressing, as a destination terminal, another wireless communication terminal (hereinafter called "relayable terminal") to which the local can relay communication', a 'relay-offer message designating a reception status parameter (including a, parameter of reception power, a parameter of a use status of a frequency channel or a parameter of a distance and direction to the sender terminal) at a time the destination data information message has been received' is transmitted, (e) when said reception section has received the relay-offer message, said transmission section transmits the destination data information message to that terminal which has sent the relay-offer message, by using a transmission parameter associated with the reception status parameter designated in the relay-offer message, and f) when said reception section has received a 'destination data information message designating data information addressing, as a destination terminal, "a relayable terminal targeted for the relay-offer message transmitted earlier by said transmission section", said transmission section transmits the destination data information message to the relayable terminal.

45. The program according to claim 44, characterized in that said computer is functioned in such a way that in case where said transmission section transmits the destination data information message using said predetermined transmission parameter, transmission power for transmitting that portion in the destination data information message which designates the data information is lower than transmission power for transmitting that portion which designates the destination terminal.

* * * * *